United States Patent
Mujtaba et al.

(10) Patent No.: US 8,139,677 B2
(45) Date of Patent: Mar. 20, 2012

(54) METHOD FOR SELECTING CONSTELLATION ROTATION ANGLES FOR QUASI-ORTHOGONAL SPACE-TIME AND SPACE-FREQUENCY BLOCK CODING

(75) Inventors: Syed Mujtaba, Watchung, NJ (US); Xiaowen Wang, Bridgewater, NJ (US)

(73) Assignee: Agere Systems Inc., Allentown, PA (US)

( * ) Notice: Subject to any disclaimer, the term of this patent is extended or adjusted under 35 U.S.C. 154(b) by 178 days.

(21) Appl. No.: 12/296,434

(22) PCT Filed: Apr. 30, 2008

(86) PCT No.: PCT/US2008/061954
§ 371 (c)(1),
(2), (4) Date: Oct. 8, 2008

(87) PCT Pub. No.: WO2008/137433
PCT Pub. Date: Nov. 13, 2008

(65) Prior Publication Data
US 2010/0208716 A1    Aug. 19, 2010

Related U.S. Application Data

(60) Provisional application No. 60/927,564, filed on May 4, 2007.

(51) Int. Cl.
*H04L 27/04* (2006.01)
*H04L 27/12* (2006.01)
*H04L 27/20* (2006.01)

(52) U.S. Cl. ........ 375/299; 375/260; 375/267; 375/261; 375/264; 375/347; 455/500; 455/101

(58) Field of Classification Search ........... 375/260, 375/299, 267, 261, 264, 347; 370/203, 210; 455/500, 101
See application file for complete search history.

(56) References Cited

U.S. PATENT DOCUMENTS

| | | | |
|---|---|---|---|
| 6,950,389 B2 * | 9/2005 | Weerackody | 370/210 |
| 2004/0008616 A1 * | 1/2004 | Jung et al. | 370/203 |
| 2004/0081254 A1 | 4/2004 | Tirkkonen | 375/299 |

(Continued)

OTHER PUBLICATIONS

Liping, Xiao, et al., "A New Quasi-orthogonal Space-time Block Code," Communications and Networking in China, 2006, Chinacom '06, pp. 1-5.

(Continued)

*Primary Examiner* — Phuong Phu
(74) *Attorney, Agent, or Firm* — Mendelsohn, Drucker & Associates, P.C.; Craig M. Brown; Steve Mendelsohn

(57) ABSTRACT

In one embodiment, the present invention generates a single rotation angle that may be used to maximize diversity of a quasi-orthogonal space-time block code that encodes groups of four data symbols. Two rotation angles corresponding the first two data symbols in a group are set to zero, and two rotation angles corresponding to the second two data symbols in a group are set to a single initial value. A codeword distance matrix is determined for each possible combination of codewords and erroneously decoded codewords that may be generated using the initial rotation angle, and the minimum of the determinants of these matrices is selected. This process is repeated to generate a plurality of minimum determinants, and, for each iteration, a different single rotation angle corresponding to the second two data symbols is used. Then, a single rotation angle is selected that corresponds to the maximum of the minimum determinants.

27 Claims, 11 Drawing Sheets

U.S. PATENT DOCUMENTS

| | | | | |
|---|---|---|---|---|
| 2004/0264599 | A1 | 12/2004 | Lliev | 375/298 |
| 2005/0281322 | A1 | 12/2005 | Lee et al. | 375/146 |
| 2006/0039495 | A1* | 2/2006 | Chae et al. | 375/267 |
| 2006/0176977 | A1 | 8/2006 | Jafarkhani et al. | 375/298 |
| 2009/0003480 | A1* | 1/2009 | Chen et al. | 375/260 |
| 2009/0285332 | A1* | 11/2009 | Damen et al. | 375/299 |
| 2010/0020892 | A1* | 1/2010 | Lee et al. | 375/260 |

OTHER PUBLICATIONS

Marsch, Patrick, et al., "Quasi-Orthogonal STBC using Stretched Constellations for Low Detection Complexity," IEEE Wireless Communications and Networking Conference, 2007, pp. 758-762.

Yuen, Chau, et al., "Full-Rate Full-Diversity STBC with Constellation Rotation," IEEE Semiannual Vehicular Technology Conference, 2003, pp. 296-300.

Sharma, Naresh, and Papadias, Constantinos B., "Improved Quasi-Orthogonal Codes Through Constellation Rotation," IEEE Transactions on Communications, vol. 51, No. 3, Mar. 2003, pp. 332-335.

Wang, Dong, and Xia, Xiang-Gen, "Optimal Diversity Product Rotations for Quasi-Orthogonal STBC with MPSK Symbols," IEEE Communications Letters, vol. 9, No. 5, May 2005, pp. 420-422.

Su, Weifeng, and Xia, Xiang-Gen, "Signal Constellations for Quasi-Orthogonal Space-Time Block Codes With Full Diversity," IEEE Transactions on Information Theory, vol. 50, No. 10, Oct. 2004, pp. 2331-2347.

Supplementary European Search Report for corresponding European Application No. EP 08 79 5830; Mail Date: Nov. 2, 2010.

* cited by examiner

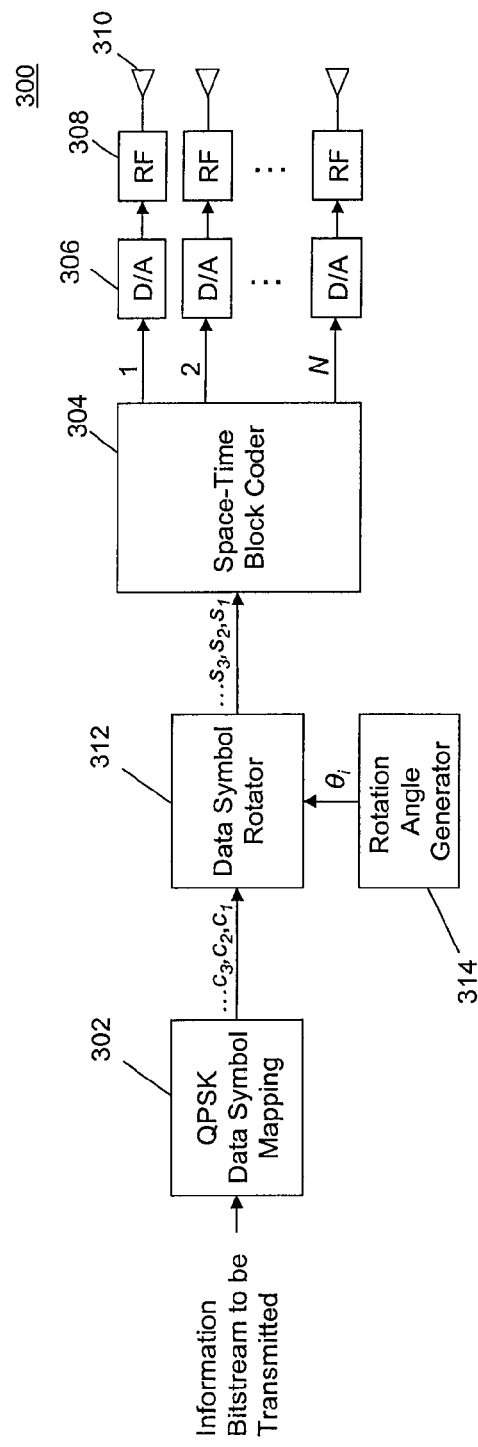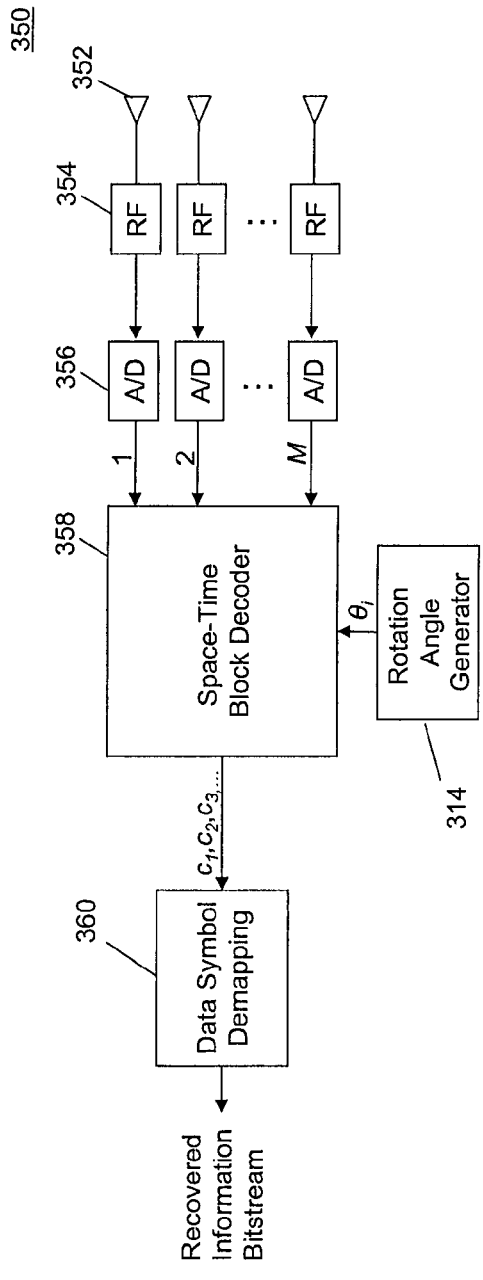

METHOD FOR SELECTING CONSTELLATION ROTATION ANGLES FOR QUASI-ORTHOGONAL SPACE-TIME AND SPACE-FREQUENCY BLOCK CODING

CROSS-REFERENCE TO RELATED APPLICATIONS

This application claims the benefit of the filing date of U.S. provisional application No. 60/927,564 filed on May 4, 2007, the teachings of which are incorporated herein by reference.

BACKGROUND OF THE INVENTION

1. Field of the Invention

The present invention relates to wireless communications networks, and, in particular, to diversity techniques used for signal transmission and reception.

2. Description of the Related Art

In wireless communication systems, a transmitted signal may travel over multiple different propagation paths to a receiver antenna. Each propagation path carries a version of the transmitted signal that is altered due to factors such as the length of the path, the number of reflections in the path, and the characteristics of any objects in the path. These factors may vary from one path to the next, and, as a result, each version of the transmitted signal may arrive at the receiver antenna with a delay, a signal attenuation, and a phase shift that are different from those of the other versions. As the multiple versions arrive at the receiver antenna, they may constructively or destructively interfere with one another such that the signal received by the receiver is an amplified or attenuated version of the transmitted signal. If attenuation is relatively severe, then errors may result when decoding the received signal preventing the receiver from recovering the communicated information.

A variety of different techniques, known as diversity techniques, may be employed in a wireless communications network to improve the likelihood that the receiver will be able to recover the communicated information. In general, diversity techniques create multiple "diverse" copies of the information being communicated so that the receiver may have multiple opportunities to decode the information. The multiple "diverse" copies may be created using diversity techniques such as antenna diversity, including spatial diversity and polarization diversity, temporal diversity, and frequency diversity. If the multiple copies are sufficiently diverse (i.e., different), then the likelihood that all of the multiple copies will be attenuated in the same manner is relatively low. Thus, when one or more copies experience relatively severe attenuation, the communicated information may be recovered from the remaining copies. The receiver may combine all of the copies in an optimal way to recover as much of the communicated information as possible. Note that a wireless communications system may use multiple diversity techniques to further improve the likelihood that the receiver will be able to recover the communicated information. A discussion of different diversity techniques may be found in Tarokh, "Space-Time Codes for High Data Rate Wireless Communication: Performance Criterion and Code Construction," IEEE Transactions on Information Theory, Vol. 44, No. 2, March 1998, pgs 744-765, the teachings of which are incorporated herein by reference in their entirety.

SUMMARY OF THE INVENTION

In one embodiment, the present invention is a method for determining K rotation angles for rotating a set of K input data symbols to be applied to a block code that encodes the resulting set of K rotated data symbols. The method selects a first rotation angle for a first subset of the K rotation angles. Then a metric is generated for each combination of (i) each of a plurality of different possible second rotation angles for a second subset of the K rotation angles, (ii) each of a plurality of different possible codewords for the first rotation angle and each possible second rotation angle, and (iii) each of a plurality of different possible erroneously decoded codewords for each possible codeword. Based on the generated metric, the method selects a second rotation angle for the second subset of the K rotation angles. The selected first and second rotation angles are then used to configure a transmitter. For each set of K input data symbols, the transmitter is adapted to (1) rotate the first subset of the K input data symbols based on the selected first rotation angle, (2) rotate the second subset of the K input data symbols based on the selected second rotation angle; and (3) apply the block code to the resulting set of K rotated data symbols to generate an outgoing codeword for transmission from the transmitter.

In another embodiment, the present invention is a transmitter comprising a data symbol rotator and a block coder. The data symbol rotator is adapted to rotate a set of K input data symbols by K rotation angles to generate a set of K rotated data symbols. The block coder adapted to apply a block code to the set of K rotated data symbols to generate a codeword for transmission from the transmitter. The K rotation angles are generated by selecting a first rotation angle for a first subset of the K rotation angles. Next, a metric is determined for each combination of (i) each of a plurality of different possible second rotation angles for a second subset of the K rotation angles, (ii) each of a plurality of different possible codewords for the first rotation angle and each possible second rotation angle, and (iii) each of a plurality of different possible erroneously decoded codewords for each possible codeword. Then, the second rotation angle is selected for the second subset of the K rotation angles based on the metric.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 3A shows a simplified block diagram of one implementation of a conventional wireless communications transmitter that employs space-time block coding and constellation rotation;

FIG. 3B shows a simplified block diagram of one implementation of a conventional wireless communications receiver, which may be used to receive space-time block-coded signals from the transmitter of FIG. 3A;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Overview of Transmission and Reception Using Space-Time Block Coding

Space-time block coding is a particular diversity technique used in wireless communications to achieve both temporal diversity and spatial diversity. In general, space-time block coding is implemented by generating at the transmitter multiple redundant copies of the information to be communicated. The multiple redundant copies are coded at different times to achieve temporal diversity, and the coded copies are transmitted via physically separated antennas to achieve spatial diversity.

Figure 1:
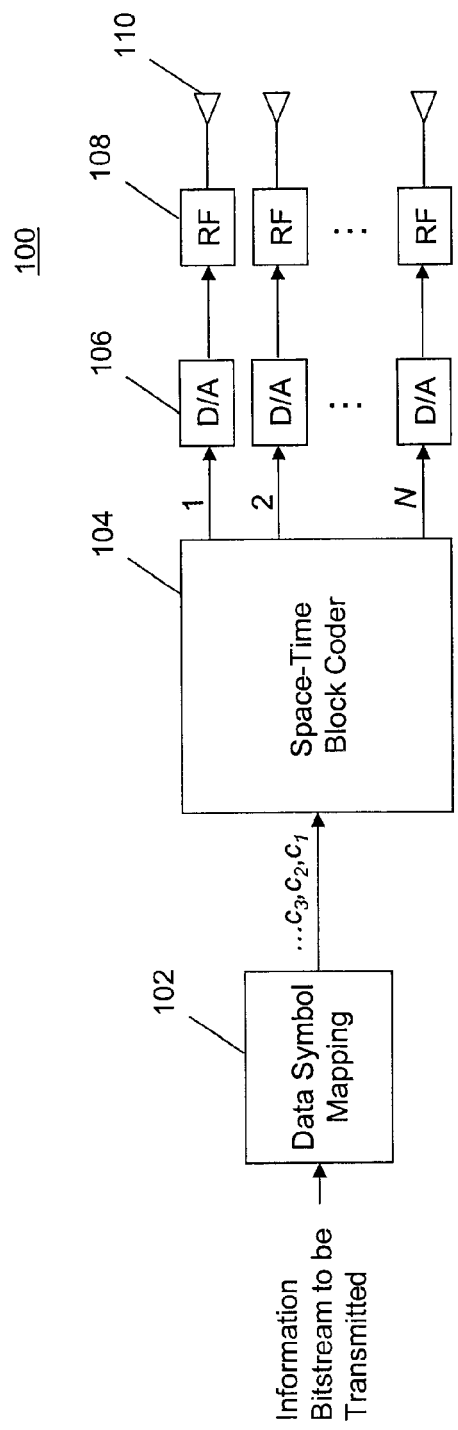
FIG. 1 shows a simplified block diagram of one implementation of a conventional wireless communications transmitter that employs space-time block coding.

FIG. 1 shows a simplified block diagram of one implementation of a conventional wireless communications transmitter 100 that employs space-time block coding. Transmitter 100 has data symbol mapper 102, which generates a stream of complex data symbols $c_i$ from a bitstream of information to be transmitted. The data symbols $c_i$ may be generated using a mapping technique such as quadrature phase shift keying (QPSK), quadrature amplitude modulation (QAM), or any other suitable mapping technique.

Space-time block coder 104 receives the stream of complex data symbols $c_i$ and codes each group of K data symbols $c_i$ using a space-time block code (STBC) to generate a codeword. As shown in FIG. 1, transmitter 100 has N antennas 110. Space-time block coder 104 encodes each group of K data symbols $c_i$ into T sets of encoded data symbols, each set having N encoded data symbols. The T sets of encoded data symbols are transmitted by transmitter 100 over T different time periods. During each of the t time periods, each of the N antennas 110 transmits a different one of the N encoded data symbols in the corresponding set of encoded data symbols.

An STBC x may be represented as a matrix as shown in Equation (1):

$$x = \begin{bmatrix} x_1^1 & x_2^1 & \dots & x_N^1 \\ x_1^2 & x_2^2 & \dots & x_N^2 \\ \vdots & & & \vdots \\ x_1^T & x_2^T & \dots & x_N^T \end{bmatrix}, \quad (1)$$

where each element $x_n^t$ of the code corresponds to a different transmitter antenna n, where n=1, ..., N, and to a different transmission time t of the N transmitter antennas, where t=1, ..., T. Each element $x_n^t$ of the code represents an operation that is performed on an input data symbol $c_i$. Such operations include, but are not limited to, taking the complex conjugate of the data symbol $c_i$, taking the negated value of the data symbol $c_i$, taking the negated value of the complex conjugate of the data symbol $c_i$, and leaving the data symbol $c_i$ unmodified.

Space-time block coder 104 applies the STBC to a group of K data symbols $c_i$ to generate a codeword c. For example, consider the exemplary STBC of Equation (2), which may be used to code groups of four data symbols for transmission via four different transmitter antennas (i.e., columns) and during four different transmission times (i.e., rows) (i.e., K=4, N=4, T=4):

$$x = \begin{bmatrix} x_1 & x_2 & x_3 & x_4 \\ -x_2^* & x_1^* & -x_4^* & x_3^* \\ -x_3^* & -x_4^* & x_1^* & x_2^* \\ x_4 & -x_3 & -x_2 & x_1 \end{bmatrix}, \quad (2)$$

where (i) element $x_k$ represents that the $k^{th}$ data symbol in a group of 4 data symbols, where k=1, ..., 4, is not modified, (ii) element $x_k^*$ represents that the complex conjugate value is taken for the $k^{th}$ data symbol, (iii) element $-x_k$ represents that the negated value is taken for the $k^{th}$ data symbol, and (iv) element $-x_k^*$ represents that the negated value of the complex conjugate value is taken for the $k^{th}$ data symbol. For example, suppose that space-time block coder 104 receives data symbols $c_1$, $c_2$, $c_3$, and $c_4$ from data symbol mapper 102. These data symbols may be arranged according to STBC x of Equation (2), such that $c_1$ corresponds to $x_1$, $c_2$ corresponds to $x_2$, $c_3$ corresponds to $x_3$, and $c_4$ corresponds to $x_4$. The resulting codeword $c_1$ may be expressed as shown in Equation (3) below:

$$c_1 = \begin{bmatrix} c_1 & c_2 & c_3 & c_4 \\ -c_2^* & c_1^* & -c_4^* & c_3^* \\ -c_3^* & -c_4^* & c_1^* & c_2^* \\ c_4 & -c_3 & -c_2 & c_1 \end{bmatrix}, \quad (3)$$

Next, space-time block coder 104 receives data symbols $c_5$, $c_6$, $c_7$, and $c_8$. These data symbols may be arranged according to STBC x of Equation (2), such that $c_5$ corresponds to $x_1$, $c_6$ corresponds to $x_2$, $c_7$ corresponds to $x_3$, and $c_8$ corresponds to $x_4$. The resulting codeword $c_2$ may be expressed as shown in Equation (4) below:

$$c_2 = \begin{bmatrix} c_5 & c_6 & c_7 & c_8 \\ -c_6^* & c_5^* & -c_8^* & c_7^* \\ -c_7^* & -c_8^* & c_5^* & c_6^* \\ c_8 & -c_7 & -c_6 & c_5 \end{bmatrix} \quad (4)$$

Note that the combination of four data symbols $c_i$ used to generate each codeword c may vary from one group to the next, and, thus, space-time block coder 104 may generate a number of possible different codewords. The total number P of possible different codewords that may be generated by the STBC of Equation (2) depends on the number of combinations of four data symbols that may be generated based on the particular data symbol mapping technique employed by data symbol mapper 102. For example, if data symbol mapper 102 employs QPSK, then $P=4^K=4^4=256$ possible different codewords may be generated. If data symbol mapper 102 employs 16-QAM, then $P=16^K=16^4=65,536$ possible different codewords may be generated.

Referring back to FIG. 1, the codewords are prepared for transmission using, for example, digital-to-analog (D/A) conversion, radio-frequency (RF) modulation, and any other processing suitable for preparing the codewords for transmission. The codewords are then transmitted via different transmitter antennas. In this particular implementation, each column of a codeword is processed using a different D/A converter 106 and a different RF modulator 108. According to other embodiments, the entire codeword may be processed by one D/A converter and one RF modulator, and then the columns of the codeword may be distributed to the different transmitter antennas using serial-to-parallel conversion.

Figure 2:
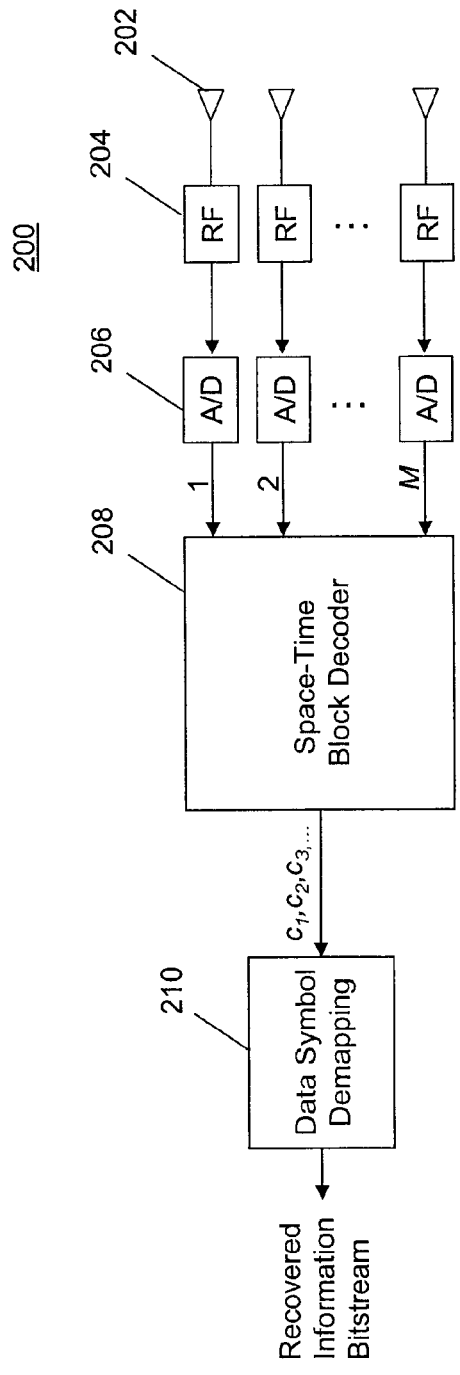
FIG. 2 shows a simplified block diagram of one implementation of a conventional wireless communications receiver, which may be used to receive space-time block-coded signals from the transmitter of FIG. 1.

FIG. 2 shows a simplified block diagram of one implementation of a conventional wireless communications receiver 200, which may be used to receive the space-time block-coded signals transmitted from transmitter 100. Receiver 200 has M antennas 202, each of which receives all N signals transmitted by transmitter 100. The number M of receiver antennas 202 may be equal to one or may be a number greater than one to achieve receive-antenna diversity.

The N signals received by each of the M receiver antennas 202 are converted (i) from RF to baseband frequency using an RF downconverter 204 and (i) from analog-to-digital format using an analog-to-digital (A/D) converter 206. The N signals received by each receiver antenna 202 may also be processed using equalization, timing correction, or other processing suitable for preparing the received signals for decoding.

Space-time block decoder 208 decodes the N signals received by each of the M receiver antennas 202 using a decoding technique such as zero-forcing, minimum mean square error, maximum-likelihood, or any other suitable technique, to generate a decoded signal. If the number M of receiver antennas 202 is greater than one, then space-time block decoder 208 may also combine the M decoded signals to generate one combined signal that is generally more reliable than the M individual decoded signals. The resulting signal is then processed downstream using, for example, data symbol demapper 210 and any other suitable processing to recover the original bitstream.

Design of Space-Time Block Code (STBC)

Several different factors may be considered in designing an STBC. These factors include, for example, the code rate and the diversity of the STBC. The code rate may be defined as the ratio of the number K of data symbols transmitted per antenna (i.e., per column of the STBC) to the number T of transmission times per STBC (i.e., the number of rows of the STBC) as shown in Equation (5) below:

$$\text{code rate} = \frac{K}{T} \quad (5)$$

If the number K of data symbols is equal to the number T of transmission times, then the STBC has a code rate equal to one (i.e., a full code rate). The STBC of Equation (2) is an example of a full-rate code. However, if the number K of data symbols is less than the number T of transmission times (i.e., rows), then the STBC has a code rate less than one. In this case, there are (T−K) transmission times per antenna that transmit additional information, such as redundant data symbols. In some applications, such as high-data-rate applications, it may be desirable to use STBCs having a data rate as close to one as possible to ensure that the number of additional or redundant data symbols transmitted is kept relatively low.

A method for determining the diversity of an STBC is disclosed in Tarokh, "Space-Time Block Codes from Orthogonal Designs," IEEE Transactions on Information Theory, Vol. 45, No. 5, July 1999, pgs 1456-1467, the teachings of which are incorporated herein by reference in their entirety. The method is based on codeword difference matrices B(c, e) that may be generated as follows. Suppose that the transmitter transmits codewords $c_p$ represented as shown in Equation (6):

$$c_p = \begin{bmatrix} c_1^1 & c_2^1 & \cdots & c_N^1 \\ c_1^2 & c_2^2 & \cdots & c_N^2 \\ \vdots & & & \vdots \\ c_1^T & c_2^T & \cdots & c_N^T \end{bmatrix} \quad (6)$$

where $c_p$ is the $p^{th}$ possible different codeword that may be generated by the STBC, where p=1, . . . , P, and $c_n^t$ represents the encoded data symbol transmitted via antenna n at time t. Further suppose that the receiver may erroneously decide that any one of L possible erroneously decoded codewords $e_p^l$ was transmitted when in fact the $p^{th}$ possible codeword $c_p$ was transmitted. The $l^{th}$ possible erroneously decoded codeword $e_p^l$, where l=1, . . . , L, that may be erroneously chosen for the $p^{th}$ possible codeword $c_p$ may be represented as shown in Equation (7):

$$e_p^l = \begin{bmatrix} e_1^1 & e_2^1 & \cdots & e_N^1 \\ e_1^2 & e_2^2 & \cdots & e_N^2 \\ \vdots & & & \vdots \\ e_1^T & e_2^T & \cdots & e_N^T \end{bmatrix} \quad (7)$$

For an application that employs QPSK mapping, there may be $L=P-1=4^4-1=255$ possible erroneously decoded codewords $e_p^l$ for each possible different codeword $c_p$ transmitted. For applications that employ higher-order data symbol mapping, the number L of possible erroneously decoded codewords $e_p^l$ for each possible different codeword $c_p$ may be even larger.

Each codeword difference matrix B(c, e) may be defined by subtracting the $p^{th}$ possible codeword $c_p$ from the $l^{th}$ erroneously decoded codeword $e_p^l$ as shown in Equation (8):

$$B(c, e) = \begin{bmatrix} e_1^1 - c_1^1 & e_2^1 - c_2^1 & \ldots & e_N^1 - c_N^1 \\ e_1^2 - c_1^2 & e_2^2 - c_2^2 & \ldots & e_N^2 - c_N^2 \\ \vdots & & & \vdots \\ e_1^T - c_1^T & e_2^T - c_2^T & \ldots & e_N^T - c_N^T \end{bmatrix} \quad (8)$$

When every possible codeword difference matrix B(c, e) is full rank, the STBC has achieved the maximum possible (i.e., full) diversity. The maximum possible diversity may be defined as the product of the number N of transmitter antennas and the number M of receiver antennas (i.e., max. diversity=MN). When every possible codeword difference matrix B(c, e) is not full rank, the diversity of the STBC is equal to the product of the minimum rank b of the possible codeword difference matrices B(c, e) and the number M of transmitter antennas (i.e., diversity=bM).

Tarokh also discloses a method for designing STBCs that achieves full diversity. In particular, Tarokh discloses that full diversity may be achieved by designing the columns of the STBC to be orthogonal to one another. However, one drawback to orthogonal STBCs is that only one orthogonal STBC, known as the Alamouti code, is capable of achieving a full code rate. Orthogonal STBCs that are employed for transmitters having more than two antennas are not capable of achieving a full code rate.

A method for designing STBCs that achieve a full code rate is disclosed in Jafarkhani, "A Quasi-Orthogonal Space-Time Block Code," IEEE Transactions on Communications, Vol. 49, No. 1, January 2001, pages 1-4, the teachings of which are incorporated herein by reference in their entirety. Jafarkhani discloses that a full rate may be achieved by designing quasi-orthogonal STBCs in which some, but not all, of the STBC columns are orthogonal to one another. The STBC of Equation (2) above is an example of a quasi-orthogonal STBC that achieves a full code rate. Since all of the columns of quasi-orthogonal STBCs are not orthogonal to one another, quasi-orthogonal STBCs alone do not achieve full diversity.

A method for designing a quasi-orthogonal STBC that achieves both a full code rate and full diversity is disclosed in Yuen, "Full-Rate Full-Diversity STBC with Constellation Rotation," The 57th IEEE Semiannual Vehicular Technology Conference, Vol. 1, Spring 2003, pages 296-300, the teachings of which are incorporated herein by reference in their entirety. Yuen discloses that full diversity may be achieved for the STBC of Equation (2) using QPSK mapping with constellation rotation. As an example, consider conventional transmitter 300 of FIG. 3A.

FIG. 3A shows a simplified block diagram of one implementation of a conventional wireless communications transmitter 300 that employs space-time block coding and QPSK mapping with constellation rotation. Transmitter 300 has data symbol mapper 302, which generates a stream of complex data symbols $c_i$ from a bitstream of information to be transmitted using QPSK mapping. Data symbol rotator 312 applies a different rotation angle $\theta_k$ to each data symbol $c_i$ in a group of four data symbols to generate four rotated data symbols $s_i$. The rotation angles $\theta_k$ may be generated using rotation angle generator 314, which may be either integral to or physically separate from data symbol rotator 312.

Figure 4:
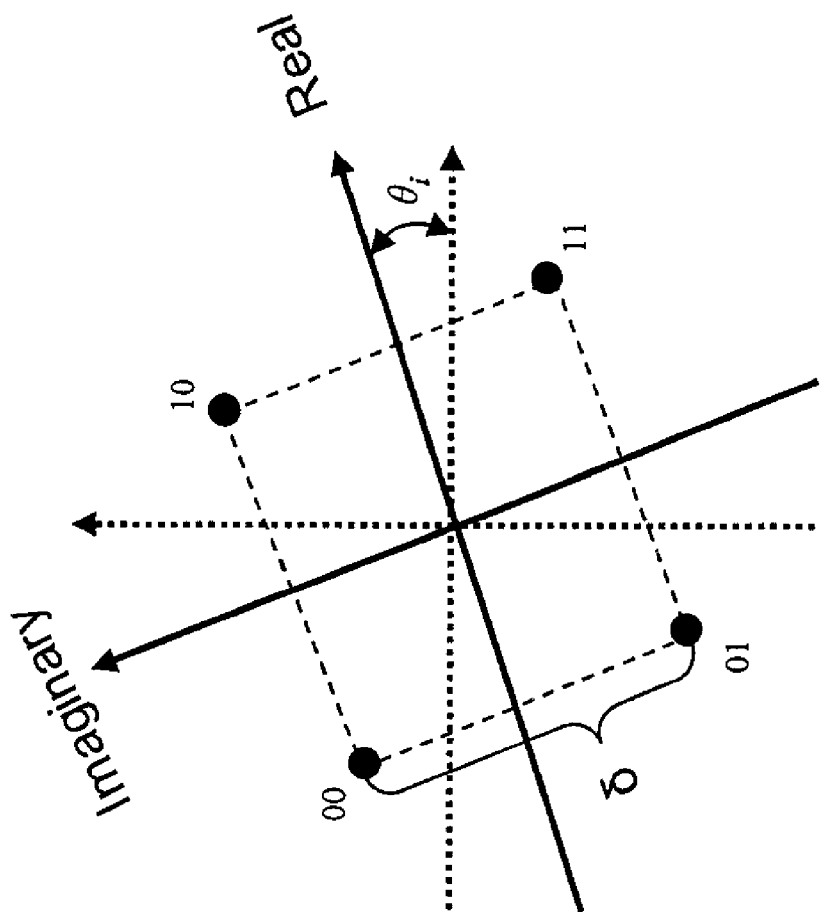
FIG. 4 graphically illustrates an exemplary rotated quadrature phase shift keying (QPSK) constellation.

FIG. 4 graphically illustrates an exemplary rotated QPSK constellation. Suppose data symbol rotator 312 rotates the eight exemplary data symbols $c_1, c_2, \ldots, c_8$ described above in relation to Equations (3) and (4) before they are encoded. Each of the first four data symbols $c_1$, $c_2$, $c_3$, and may be rotated by an angle $\theta_k$, where k=1, 2, 3, 4 as shown in Equation (9):

$$s_i = c_i e^{j\theta_k} \quad (9)$$

Thus, data symbols $c_1, c_2, c_3$, and $c_4$ may be rotated by angles $\theta_1, \theta_2, \theta_3$, and $\theta_4$, respectively, to generate rotated data symbols $s_1, s_2, s_3$, and $s_4$, respectively. Similarly, data symbols $c_5, c_6, c_7$, and $c_8$ may be rotated by angles $\theta_1, \theta_2, \theta_3$, and $\theta_4$, respectively, to generate rotated data symbols $s_5, s_6, s_7$, and $s_8$, respectively.

Space-time block coder 304 arranges the four rotated data symbols $s_1, s_2, s_3$, and $s_4$ according to STBC x of Equation (2), such that $s_1$ corresponds to $x_1$, $s_2$ corresponds to $x_2$, $s_3$ corresponds to $x_3$, and $s_4$ corresponds to $x_4$. The resulting codeword $s_1$ may be expressed as shown in Equation (10) below:

$$s_1 = \begin{bmatrix} s_1 & s_2 & s_3 & s_4 \\ -s_2^* & s_1^* & -s_4^* & s_3^* \\ -s_3^* & -s_4^* & s_1^* & s_2^* \\ s_4 & -s_3 & -s_2 & s_1 \end{bmatrix} \quad (10)$$

Next, space-time block coder 304 arranges the four rotated data symbols $s_5, s_6, s_7$, and $s_8$ according to STBC x of Equation (2), such that $s_5$ corresponds to $x_1$, $s_6$ corresponds to $x_2$, $s_7$ corresponds to $x_3$, and $s_8$ corresponds to $x_4$. The resulting codeword $s_2$ may be expressed as shown in Equation (11) below:

$$s_2 = \begin{bmatrix} s_5 & s_6 & s_7 & s_8 \\ -s_6^* & s_5^* & -s_8^* & s_7^* \\ -s_7^* & -s_8^* & s_5^* & s_6^* \\ s_8 & -s_7 & -s_6 & s_5 \end{bmatrix} \quad (11)$$

After space-time block coder 304, the codewords may be processed in a manner similar to that of transmitter 100 of FIG. 1, using D/A conversion 306, RF modulation 308, and any other suitable processing. The codewords are then transmitted via different antennas 310.

FIG. 3B shows a simplified block diagram of one implementation of a conventional wireless communications receiver 350, which may be used to receive the space-time block-coded signals transmitted from transmitter 300. Receiver 350 has antennas 352, RF down converter 354, and A/D converter 356, which perform operations analogous to those of the equivalent processing of receiver 200 of FIG. 2. Further, receiver 350 may perform equalization, timing correction, or other processing suitable for recovering codewords and preparing the codewords for decoding.

Space-time block decoder 358 decodes each codeword using a decoding technique such as zero-forcing, minimum mean square error, or any other suitable decoding technique to recover a set of k rotated data symbols $s_i$. The set of k rotated data symbols $s_i$ is de-rotated using rotation angles $\theta_1, \theta_2, \theta_3$, and $\theta_4$ generated by rotation angle generator 314 to recover a set of k de-rotated data symbols $c_i$. Rotation angle generator 314 may be either integral to or physically separate from space-time block decoder 358. Note that, if the number M of receiver antennas 352 is greater than one, then space-time block decoder 358 may recover M sets of k rotated data symbols $s_i$. The M sets may then be combined, before or after de-rotation, to generate one combined set of k data symbols $c_i$ that is generally more reliable than the M individual sets of rotated data symbols $c_i$. The resulting data symbols $c_i$ are then processed downstream using, for example, data symbol demapper 360 and any other suitable processing to recover the original bitstream. Note that, space-time block decoder 358 may also employ maximum-likelihood decoding to recover original bitstream. In such a case, space-time block decoder 358 may recover the original bitstream without the use of data symbol demapping 360.

Note that there are numerous different combinations of rotation angles $\theta_k$ that may be used in rotating each group of four data symbols. Jafarkhani discloses two design criteria that may be used to determine the combination of rotation angles $\theta_k$ that maximizes the diversity of the STBC of Equation (2). The design criteria are based on the determinants of codeword distance matrices A that may be generated as follows. First, each codeword difference matrix B(c, e) is generated by subtracting the $p^{th}$ possible codeword $s_p$ from the $l^{th}$ erroneously decoded codeword $e_p^l$ in a manner similar to that described above in relation to Equation (8). For equation (2), each codeword difference matrix B(c, e) may be expressed as shown in Equation (12) as follows:

$$B(s, e) = \begin{bmatrix} \Delta_1 & \Delta_2 & \Delta_3 & \Delta_4 \\ -\Delta_2^* & \Delta_1^* & -\Delta_4^* & \Delta_3^* \\ -\Delta_3^* & -\Delta_4^* & \Delta_1^* & \Delta_2^* \\ \Delta_4 & -\Delta_3 & -\Delta_2 & \Delta_1 \end{bmatrix} \quad (12)$$

where $\Delta_i$ is the distance between an erroneously decoded data symbol $e_i$ or a correctly decoded data symbol and the rotated data symbol $s_i$ (e.g., $\Delta_i = e_i - s_i$). Next, each codeword distance matrix A is generated by multiplying each codeword difference matrix B(s, e) by its Hermitian transpose as shown in Equation (13):

$$A = \begin{bmatrix} \Delta_1 & \Delta_2 & \Delta_3 & \Delta_4 \\ -\Delta_2^* & \Delta_1^* & -\Delta_4^* & \Delta_3^* \\ -\Delta_3^* & -\Delta_4^* & \Delta_1^* & \Delta_2^* \\ \Delta_4 & -\Delta_3 & -\Delta_2 & \Delta_1 \end{bmatrix}^H \begin{bmatrix} \Delta_1 & \Delta_2 & \Delta_3 & \Delta_4 \\ -\Delta_2^* & \Delta_1^* & -\Delta_4^* & \Delta_3^* \\ -\Delta_3^* & -\Delta_4^* & \Delta_1^* & \Delta_2^* \\ \Delta_4 & -\Delta_3 & -\Delta_2 & \Delta_1 \end{bmatrix}, \quad (13)$$

where $[.]^H$ denotes the Hermitian transpose. Finally, the determinant of each codeword distance matrix A may be represented as shown in Equation (14) below:

$$\det(A) = [(\|\Delta_1 + \Delta_4\|^2 + \|\Delta_2 - \Delta_3\|^2) \times (\|\Delta_1 - \Delta_4\|^2 + \|\Delta_2 + \Delta_3\|^2)]^2 \quad (14)$$

where $\|.\|$ denotes a magnitude value.

The first criterion that may be used for maximizing diversity of the STBC of Equation (2) is to determine the four rotation angles, $\theta_1, \theta_2, \theta_3,$ and $\theta_4$, that maximize the minimum of the determinants of A (i.e., max(min(det(A)))). In particular, first, the four rotation angles $\theta_1, \theta_2, \theta_3,$ and $\theta_4$ may be fixed to initial values. Next, all of the possible codewords $s_p$ and erroneously decoded codewords $e_p^l$ that may be generated using the initialized rotation angles are determined. The determinant of A is determined for each combination of a possible codeword $s_p$ and an erroneously decoded codeword $e_p^l$, and the minimum of these determinants is found. Then, the set of rotation angles $\theta_1, \theta_2, \theta_3,$ and $\theta_4$ is changed, and the process is repeated to find the minimum determinant of A for all possible combinations of the four rotation angles. Once all of the minimum determinants are found, a combination of four rotation angles corresponding to the maximum of these minimum determinants is selected. Note that there may be a number of different combinations of the four rotation angles that correspond to the maximum determinant and that the designer may select any one of these different combinations.

The second criterion that may be used for maximizing diversity of the STBC of Equation (2) is to determine the four rotation angles $\theta_1, \theta_2, \theta_3,$ and $\theta_4$ that minimize the average of the reciprocals of the determinants of A (i.e., min((1/det(A))$_{average}$)). In particular, similar to the first criterion, the four rotation angles $\theta_1, \theta_2, \theta_3,$ and $\theta_4$ are fixed to initial values. The determinant of A is determined for each combination of a possible codeword $s_p$ and an erroneously decoded codeword $e_p^l$ that may be generated using the initialized rotation angles. Next, the reciprocal of each determinant of A is computed, and the average of all of the reciprocals is determined. Then, the set of rotation angles $\theta_1, \theta_2, \theta_3,$ and $\theta_4$ is changed, and this process is repeated to find the average of the reciprocals of determinants of A for all possible combinations of the four rotation angles. Once all of the average reciprocal values are determined, a combination of four rotation angles corresponding to the minimum of these average reciprocals is selected. Note that there may be a number of different combinations of the four rotation angles that correspond to the minimum of the average reciprocals, and that the designer may select any one of these different combinations.

The number of calculations that must be performed using the two above-mentioned criteria is relatively large. As a result, the process for determining the combination of four rotation angles $\theta_1, \theta_2, \theta_3,$ and $\theta_4$ that maximizes diversity is computationally intensive and time-consuming A method for selecting the four rotation angles based on the above two criteria may be envisioned in which the number of calculations that are performed is reduced. In particular, the number of calculations may be reduced based on several observations.

First, it may be observed from Equation (14) that the minimum determinant of A for each different combination of four rotation angles occurs when $\|\Delta_1\|=\|\Delta_4\|$ and $\|\Delta_2\|=\|\Delta_3\|$. Next, it may be observed that only the relative angle between the first data symbol and fourth data symbol in a group or the relative angle between the second data symbol and third data symbol in a group affect the outcome. As a result, the number of permutations may be reduced by setting both $\theta_1$ and $\theta_2$ equal to zero (i.e., $\theta_1 = \theta_2 = 0$).

One possible instance in which the minimum determinant may occur is when $\Delta_1 = \Delta_2 = \Delta_3 = 0$ and $\Delta_4 = \delta$, where $\delta$ is the minimum distance between two constellation points as shown in FIG. 3. Substituting these values into Equation (12) and solving for the determinant of A results in a determinant of A value of $\delta^8$ (i.e., det(A)=$\delta^8$). For QPSK mapping, if the rotation angles $\theta_3$ and $\theta_4$ satisfy $1-\cos^2\theta_k > \frac{1}{4}$, for k=3, 4 (i.e., $\theta_3$ and $\theta_4$ are greater than 0.5236 radians), then the minimum determinant of A will be less than or equal to $\delta^8$ (i.e., min(det(A))$\leq\delta^8$). Therefore, the maximum of the minimum determinants of A is equal to $\delta^8$ (i.e., max(min(det(A)))=$\delta^8$. To simplify the design and reduce the number of permutations, $\theta_3$ may be set equal to $\theta_4$ (i.e., $\theta_3 = \theta_4 = 0$). Thus, the diversity of Equation (2) may be maximized by finding only one rotation angle $\theta$ that satisfies the two above-mentioned criteria. This greatly reduces the number of permutations that must be performed.

Figure 5:
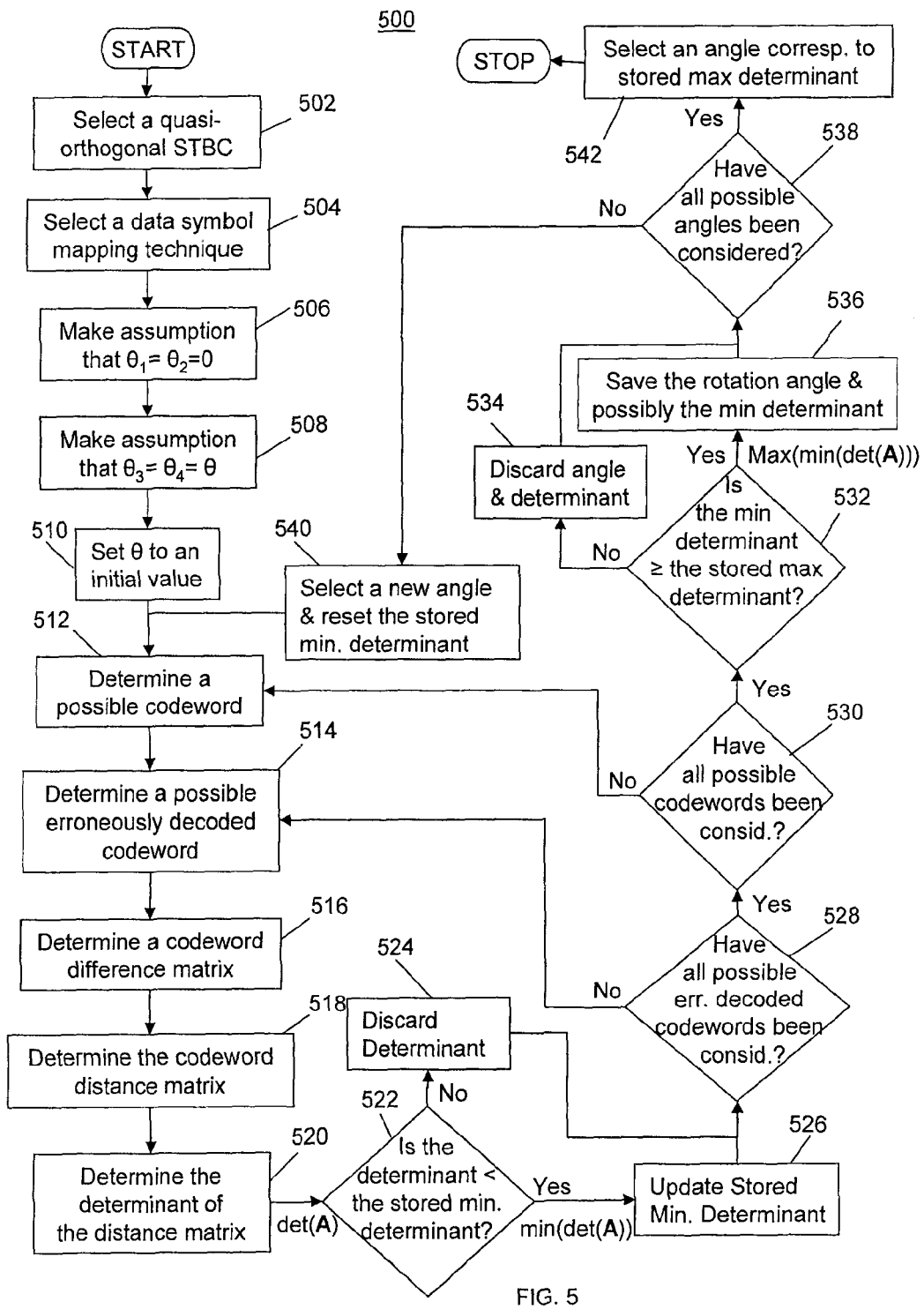
FIG. 5 is a simplified flow diagram of a rotation angle generator according to one embodiment of the present invention.

FIG. 5 is a simplified flow diagram of a rotation angle generator 500 according to one embodiment of the present invention. Rotation angle generator 500 may be used with a transmitter analogous to transmitter 300 of FIG. 3 in place of rotation angle generator 314, and it may be either integral to or physically separate from data symbol rotator 312. Rotation angle generator 500 determines a single rotation angle $\theta$ that maximizes diversity of a quasi-orthogonal STBC based on the maximum of the minimum determinant of the codeword difference matrix A (i.e., max(min(det(A)))).

Rotation angle generator 500 implements three nested loops to determine rotation angle θ: (1) a first (i.e., outer) loop that iteratively considers each of a plurality of different possible rotation angles; (2) a second (i.e., intermediate) loop that iteratively considers each of a plurality of different possible codewords for each possible rotation angle; and (3) a third (i.e., inner) loop that iteratively considers each of a plurality of different possible erroneously decoded codewords for each possible codeword.

First, a quasi-orthogonal STBC and a data symbol mapping technique are selected (steps 502 and 504, respectively). The quasi-orthogonal STBC may be an STBC that encodes groups of four data symbols for transmission via four antennas during four time periods. Further, the data symbol mapping technique may be QPSK or any other suitable technique, including, but not limited to, 16-QAM.

A first angle $\theta_1$ and second angle $\theta_2$, corresponding to the first and second data symbols in a group of four data symbols, respectively, are both set equal to zero (step 506) ($\theta_1=\theta_2=0$). A third angle $\theta_3$ and the fourth angle $\theta_4$, corresponding to the third and fourth data symbols in a group of four data symbols, are set equal to one another such that they may be represented by a single angle θ (step 508) ($\theta_3=\theta_4=\theta$). For the first iteration, angle θ is set to an initial value (step 510).

A possible codeword $s_p$ is determined (step 512) by first generating a group of four possible complex data symbols $c_i$ based on the selected mapping technique. Next, the first and second possible data symbols are rotated by zero and the third and fourth possible data symbols are rotated by the initial rotation angle θ to generate four rotated data symbols $s_i$. Then, the four rotated data symbols $s_i$ are arranged according to the selected quasi-orthogonal STBC to generate the possible codeword $s_p$.

The minimum determinant for all possible codeword distance matrices A that may be generated based on the possible codeword $s_p$ is generated iteratively using steps 514 to 528. In step 514, a possible erroneously decoded codeword $e_p^I$ is determined in a manner similar to that of the possible codeword $s_p$. In particular, the possible erroneously decoded codeword $e_p^I$ is generated using a group of four possible data symbols $c_i$ comprising at least one possible data symbol $c_i$ that is different from a corresponding possible data symbol $c_i$ used to generate the possible codeword $s_p$. The possible codeword $s_p$ is subtracted from the possible erroneously decoded codeword $e_p^I$ to generate the codeword difference matrix B(s, e) (step 516), and the codeword distance matrix A is determined by multiplying the codeword difference matrix B(c, e) by its Hermitian transpose (step 518).

The determinant (i.e., det(A)) of the codeword distance matrix A is determined (step 520) and compared to a stored minimum determinant value (i.e., min(det(A))) (step 522). If det(A) is smaller than the min(det(A)) value, then the min(det(A)) value is updated by replacing the min(det(A)) value with det(A) (step 526). If det(A) is not smaller than the min(det(A)) value (i.e., min(detA)), then det(A) is discarded (step 524). Note that the min(det(A)) value may be initialized to a sufficiently large value, such that, for the first iteration, det(A) replaces the initialized min(det(A)) value.

Step 528 determines whether all possible erroneously decoded codewords $e_p^I$ have been considered for the currently selected codeword $s_p$. If all possible erroneously decoded codewords $e_p^I$ have not been considered, then processing returns to step 528 to select another of the possible erroneously decoded codewords $e_p^I$ for processing through steps 516-528. If step 528 determines that all possible erroneously decoded codewords $e_p^I$ have been considered for the currently selected codeword $s_p$, then processing continues to step 530.

Step 530 determines whether all of the possible codewords $s_p$ have been considered for the currently selected rotation angle. If all possible codewords $s_p$ have not been considered, then processing returns to step 512 to select another of the possible codewords $s_p$ for processing through steps 514-530. If step 530 determines that all of the possible codewords $s_p$ have been considered for the currently selected rotation angle, then processing continues to step 532.

In step 532, the min(det(A)) value is compared to a stored maximum of the minimum determinant value (i.e., max(min(det(A)))). If the min(det(A)) value is less than the stored max(min(det(A))) value, then the min(det(A)) value and corresponding rotation angle θ are discarded (step 534). If the min(det(A)) value is greater than the stored max(min(det(A))) value, then the stored max(min(det(A))) value is updated by replacing the stored max(min(det(A))) value with the min(det(A)) value (step 536). Additionally, any stored rotation angles that correspond to the stored max(min(det(A))) value are updated by replacing the stored rotation angles with the rotation angle θ corresponding to the min(det(A)) value. If the min(det(A)) value is equal to the stored max(min(det(A))) value, then the rotation angle θ corresponding to the min(det(A)) value is stored along with the stored max(min(det(A))) value and rotation angles θ, such that there may be more than one rotation angle θ corresponding to the stored max(min(det(A))) value (step 536). Note that, the max(min(det(A))) value may be initialized to a sufficiently small value (e.g., 0), such that, for the first iteration, the min(det(A)) value replaces the initialized max(min(det(A))) value.

Step 538 determines whether all possible rotation angles θ have been considered. If all possible rotation angles θ have not been considered, then a new rotation angle θ is selected (step 540), the stored min(det(A)) value is reset to the initialized min(det(A)) value, and steps 512 through 538 are repeated. The designer may select the increments of rotation angles θ and the range of rotation angles θ that are considered. For example, the rotation angles θ may be considered in 1 degree increments over a range of 0 degrees to 45 degrees. Once all possible rotation angles θ have been considered, one rotation angle θ is selected, from the set of rotation angles θ stored in step 536 that corresponds to the max(min(det(A))) value (step 542). In so doing, any one of the rotation angles θ in the set of stored rotation angles θ may be selected. Alternatively, the designer may perform additional simulations to evaluate the performance of the stored rotation angles θ in the set, and may choose the rotation angle θ that provides the best performance.

Figure 6:
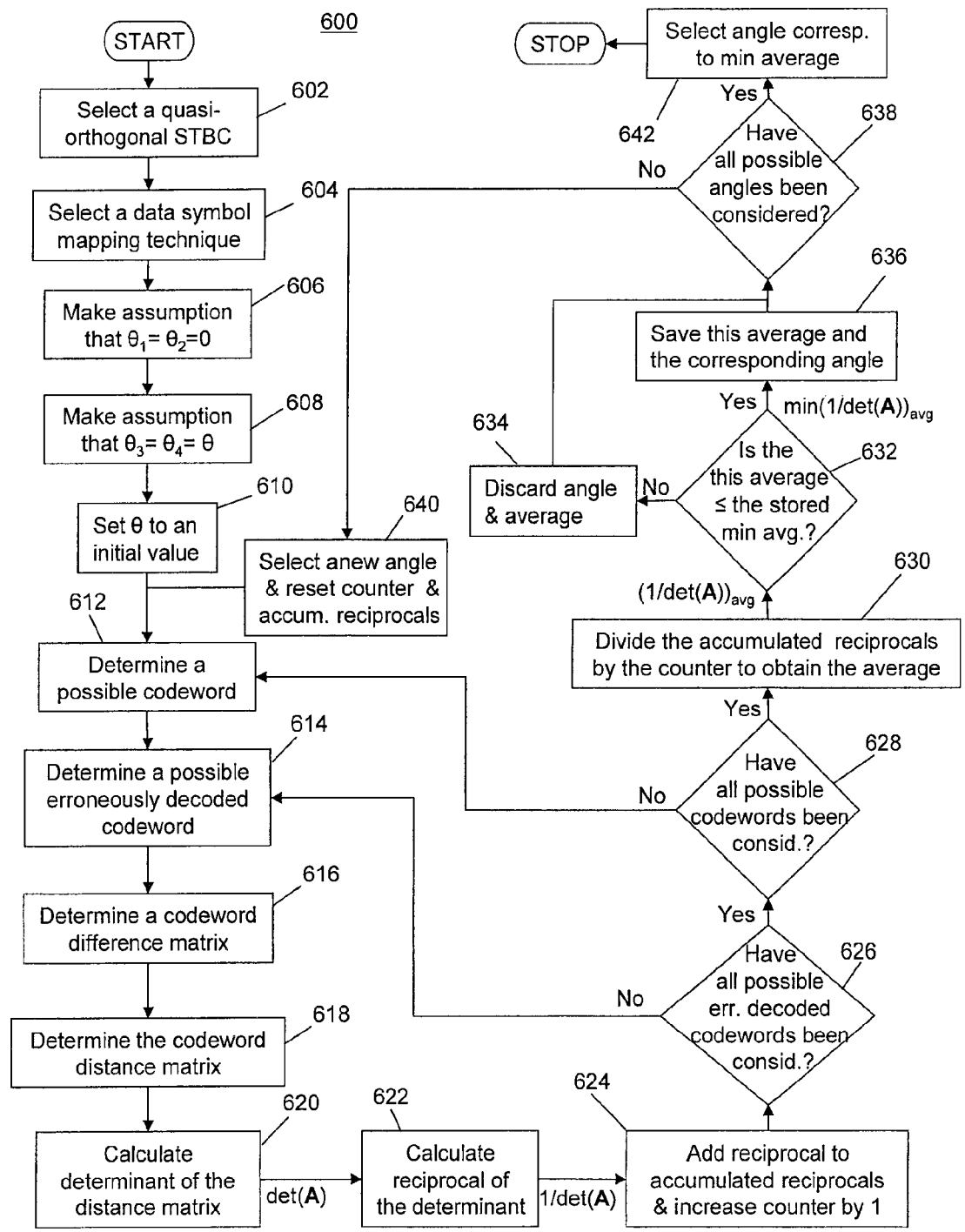
FIG. 6 is a simplified flow diagram of a rotation angle generator according to another embodiment of the present invention.

FIG. 6 is a simplified flow diagram of a rotation angle generator 600 according to another embodiment of the present invention. Rotation angle generator 600 may be used with a transmitter analogous to transmitter 300 of FIG. 3 in place of rotation angle generator 314 and it may be either integral to or physically separate from data symbol rotator 312. Rotation angle generator 600 determines a single rotation angle θ that minimizes the average reciprocals of the determinant of the codeword difference matrix A (i.e., min((1/det(A))$_{average}$)).

Rotation angle generator 600 implements three nested loops to determine rotation angle θ: (1) a first (i.e., outer) loop that iteratively considers each of a plurality of different possible rotation angles; (2) a second (i.e., intermediate) loop that iteratively considers each of a plurality of different possible codewords for each possible rotation angle; and (3) a third (i.e., inner) loop that iteratively considers each of a plurality of different possible erroneously decoded codewords for each possible codeword.

Rotation angle generator 600 has steps 602, 604, 606, 608, 610, 612, 614, 616, 618, and 620, which perform operations analogous to those of the equivalent steps of rotation angle generator 500 of FIG. 5 to generate a determinant (i.e., det (A)) of the codeword difference matrix A for one combination of a codeword $s_p$ and an erroneously decoded codeword $e_p^l$. Step 622 calculates the reciprocal (i.e., 1/det(A)) of the determinant of A. The reciprocal is added to an accumulated reciprocal value and a counter is increased by one (step 624). Both the accumulated value and the counter have an initial value of zero.

Step 626 determines whether all possible erroneously decoded codewords $e_p^l$ have been considered. If all possible erroneously decoded codewords $e_p^l$ have not all been considered, then steps 614 to 626 are repeated until all possible reciprocals have been accumulated for the possible codeword $s_p$.

Once all reciprocals have been accumulated for the possible codeword $s_p$, steps 612 through step 626 are repeated for all possible codewords $s_p$. In particular, step 628 determines whether the all possible codewords $s_p$ have been considered. If all possible codewords $s_p$ have not all been considered, then steps 612 through step 626 are repeated to accumulate the reciprocals of the determinants for all possible codeword distance matrices that may be generated based on all of the possible codewords $s_p$. If all possible codewords $s_p$ have all been considered, then step 630 divides the accumulated reciprocals by the counter value to obtain an average of the reciprocals (i.e., $(1/\det(A))_{average}$) value.

The average of the reciprocals is then compared to a stored minimum average reciprocal value (i.e., min((1/det (A))$_{average}$))(step 632). If the $(1/\det(A))_{average}$ value is less than the stored $\min((1/\det(A))_{average})$ value, then the $(1/\det(A))_{average}$ value and the rotation angle θ corresponding to the $(1/\det(A))_{average}$ value are discarded (step 634). If the $(1/\det(A))_{average}$ value is greater than the stored $\min((1/\det(A))_{average})$ value, then the stored $\min((1/\det(A))_{average})$ value is updated by replacing the stored $\min((1/\det(A))_{average})$ value with the $(1/\det(A))_{average}$ value (step 636). Additionally, any stored rotation angles θ that correspond to the stored $\min((1/\det(A))_{average})$ value are updated by replacing the stored rotation angle values with the rotation angle θ corresponding to the $(1/\det(A))_{average}$ value. If the $(1/\det(A))_{average}$ value is equal to the stored $\min((1/\det(A))_{average})$ value, then the rotation angle θ corresponding to the $(1/\det(A))_{average}$ value is stored along with the stored $\min((1/\det(A))_{average})$ value and rotation angles θ, such that there may be more than one rotation angle θ corresponding to the stored $\min((1/\det(A))_{average})$ value (step 636). Note that the stored $\min((1/\det(A))_{average})$ value may be initialized to a sufficiently large value, such that, for the first iteration, the $(1/\det(A))_{average}$ value replaces the initialized $\min((1/\det(A))_{average})$ value.

Steps 612 through 638 are repeated for all possible rotation angles θ. Step 638 determines whether all possible rotation angles θ have been considered. If all possible rotation angles θ have not been considered, then the counter value is reset to zero, the accumulated reciprocal value is reset to zero, a new rotation angle θ is selected (step 640), and steps 612 through 638 are repeated. The designer may select the increments of rotation angles θ and the range of rotation angles θ that are considered. For example, the rotation angles θ may be considered in 0.01 radian increments over a range of 0 radians to π/4 radians. Once all possible rotation angles θ have been considered, one rotation angle θ is selected from the set of rotation angles θ saved during step 636 that correspond to the stored $\min((1/\det(A))_{average})$ value (step 642). In so doing, any one of the rotation angles θ in the set of stored rotation angles θ may be selected. Alternatively, the designer may perform additional simulations to evaluate the performance of the rotation angles θ in the set, and may choose the rotation angle θ that provides the best performance.

According to various embodiments of the present invention, the number of calculations performed in considering the above two mentioned criteria may be further reduced by considering every possible distance value $\Delta_i$ rather than every combination of a possible codeword $s_p$ and an erroneously decoded codeword $e_p^l$. For example, in the case of QPSK, there are nine different possible distance values $\Delta_i$ that may be obtained from a QPSK constellation. Each distance value $\Delta_i$ is obtained by subtracting a possible erroneously decoded data symbol $e_i$ or a correctly decoded data symbol from a rotated data symbol $s_i$ (e.g., $\Delta_i = e_i - s_i$). Note that, subtracting a correctly decoded data symbol from a rotated data symbol $s_i$ results in a distance value $\Delta_i$ of zero. Since there are four distance values $\Delta_i$ in each determinant calculation of Equation (14), there are $9^4 - 1 = 6{,}561$ possible different combinations of distance values $\Delta_i$ for each combination of four rotation angles that may be considered. In considering every combination of a possible codeword $s_p$ and an erroneously decoded codeword $e_p^l$, on the other hand, there are 256 possible codewords $s_p$ and 256 possible erroneously decoded codewords $e_p^l$ for each combination of four rotation angles, and therefore, there are $256 * 256 - 1 = 65{,}535$ possible combinations to consider for each combination of four rotation angles. Thus, the number of combinations is greatly reduced by considering the possible distance values $\Delta_i$.

Figure 7:
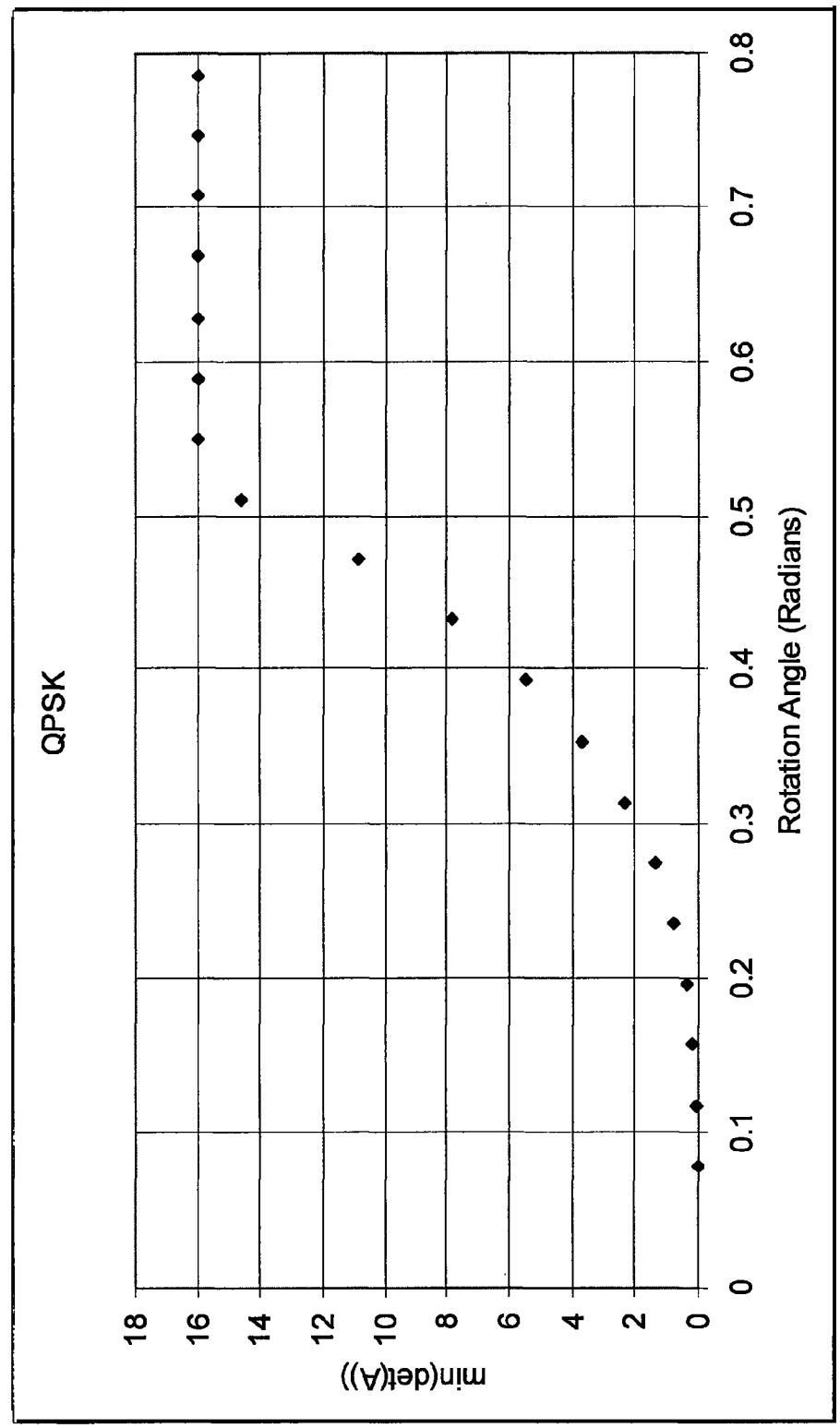
FIG. 7 graphically illustrates minimum determinant values for codeword distance matrices generated using QPSK mapping for various rotation angles.
Figure 8:
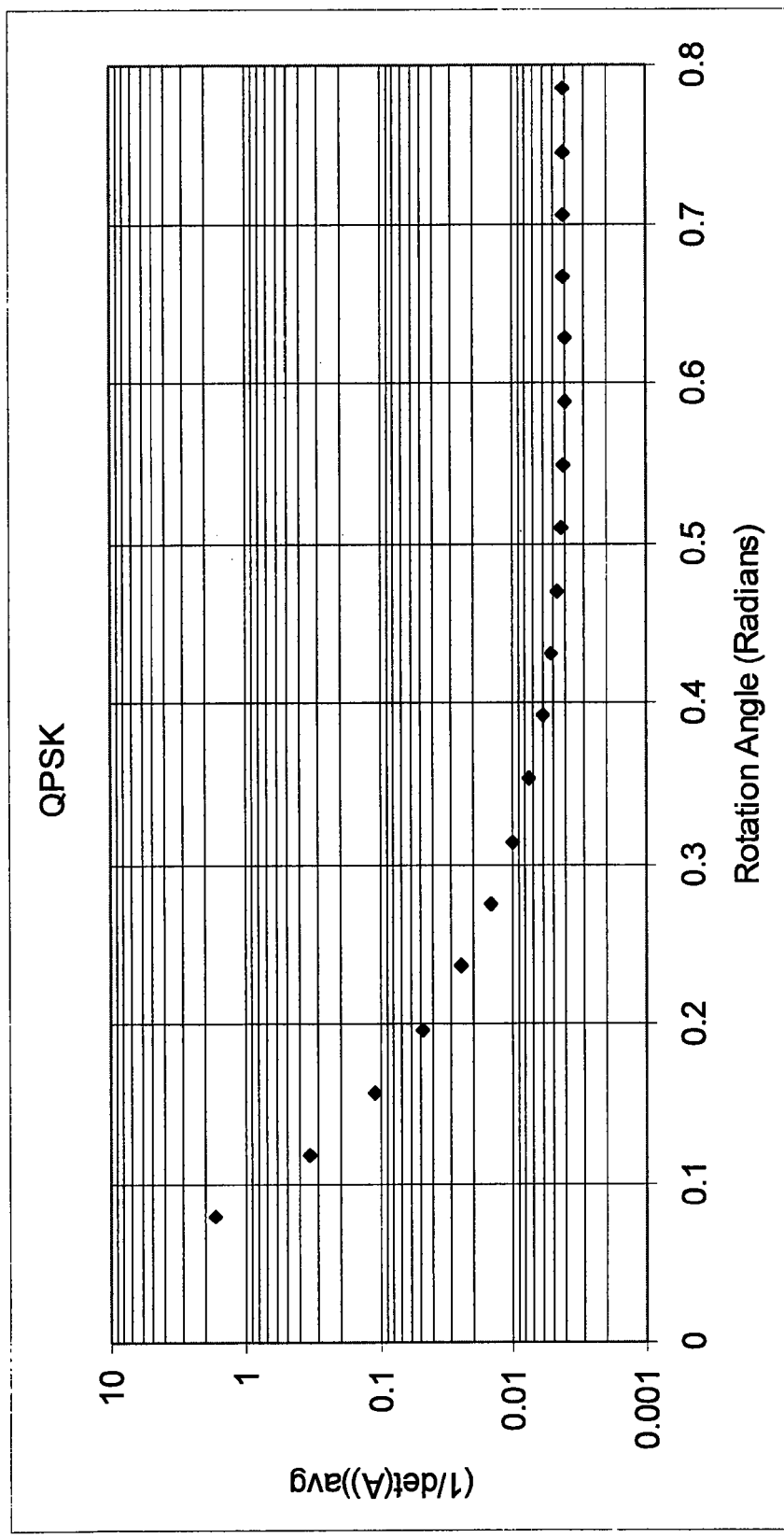
FIG. 8 graphically illustrates average reciprocal values for determinants of codeword distance matrices generated using QPSK mapping for various rotation angles.
Figure 9:
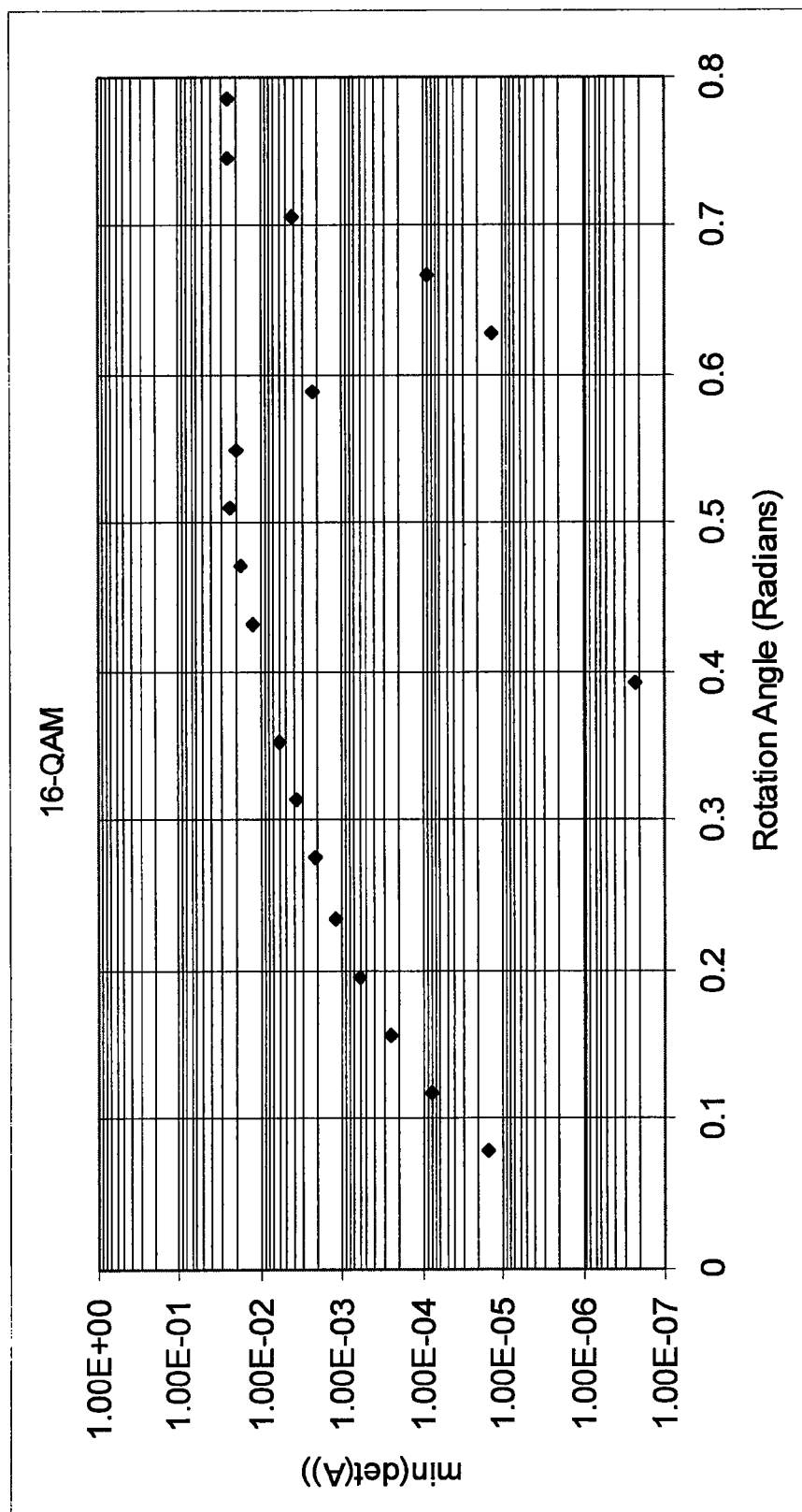
FIG. 9 graphically illustrates minimum determinant values for codeword distance matrices generated using 16-quadrature amplitude modulation (16-QAM) mapping for various rotation angles.
Figure 10:
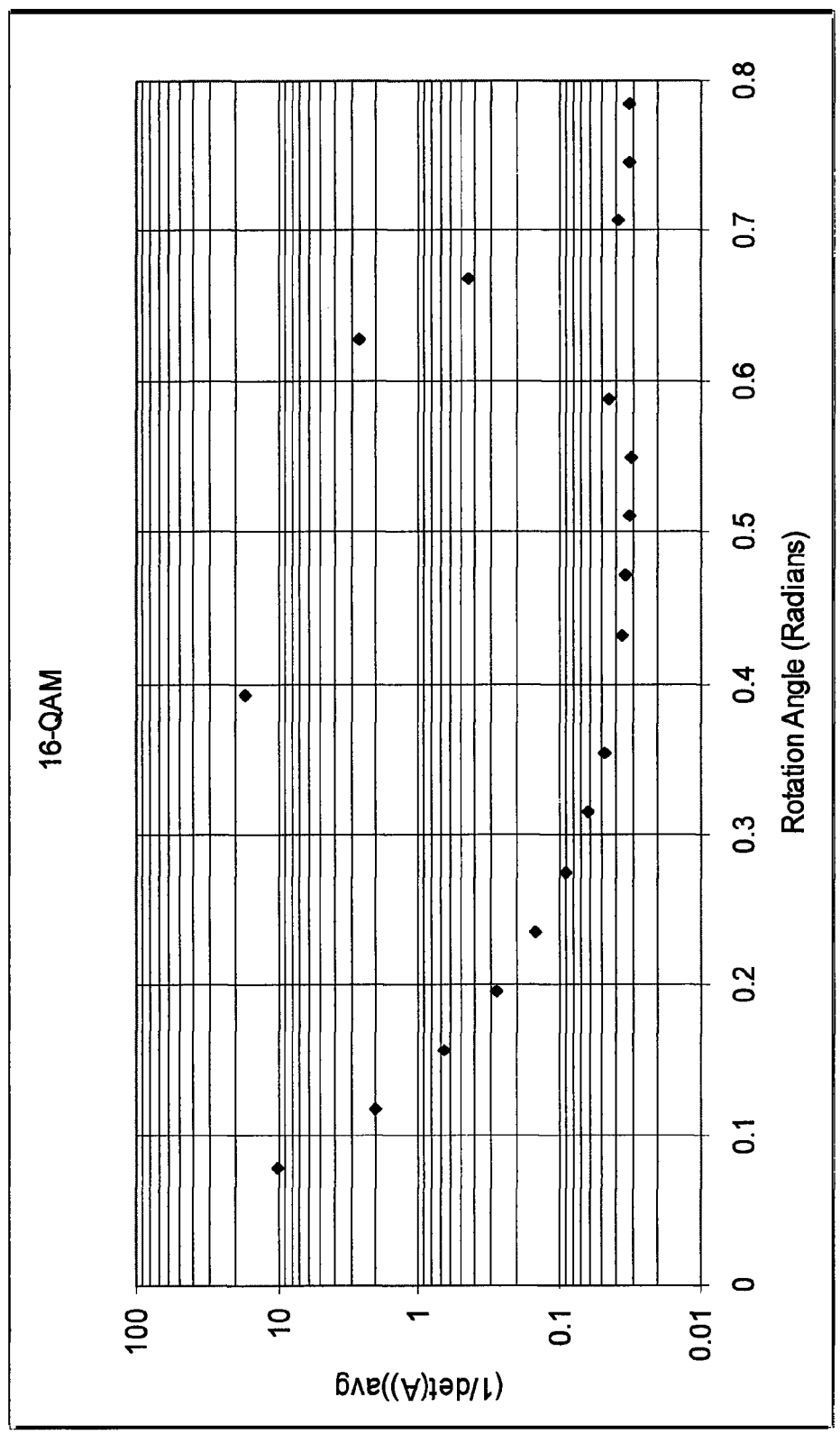
FIG. 10 graphically illustrates average reciprocal values for determinants of codeword distance matrices generated using 16-QAM mapping for various rotation angles.
Figure 11:
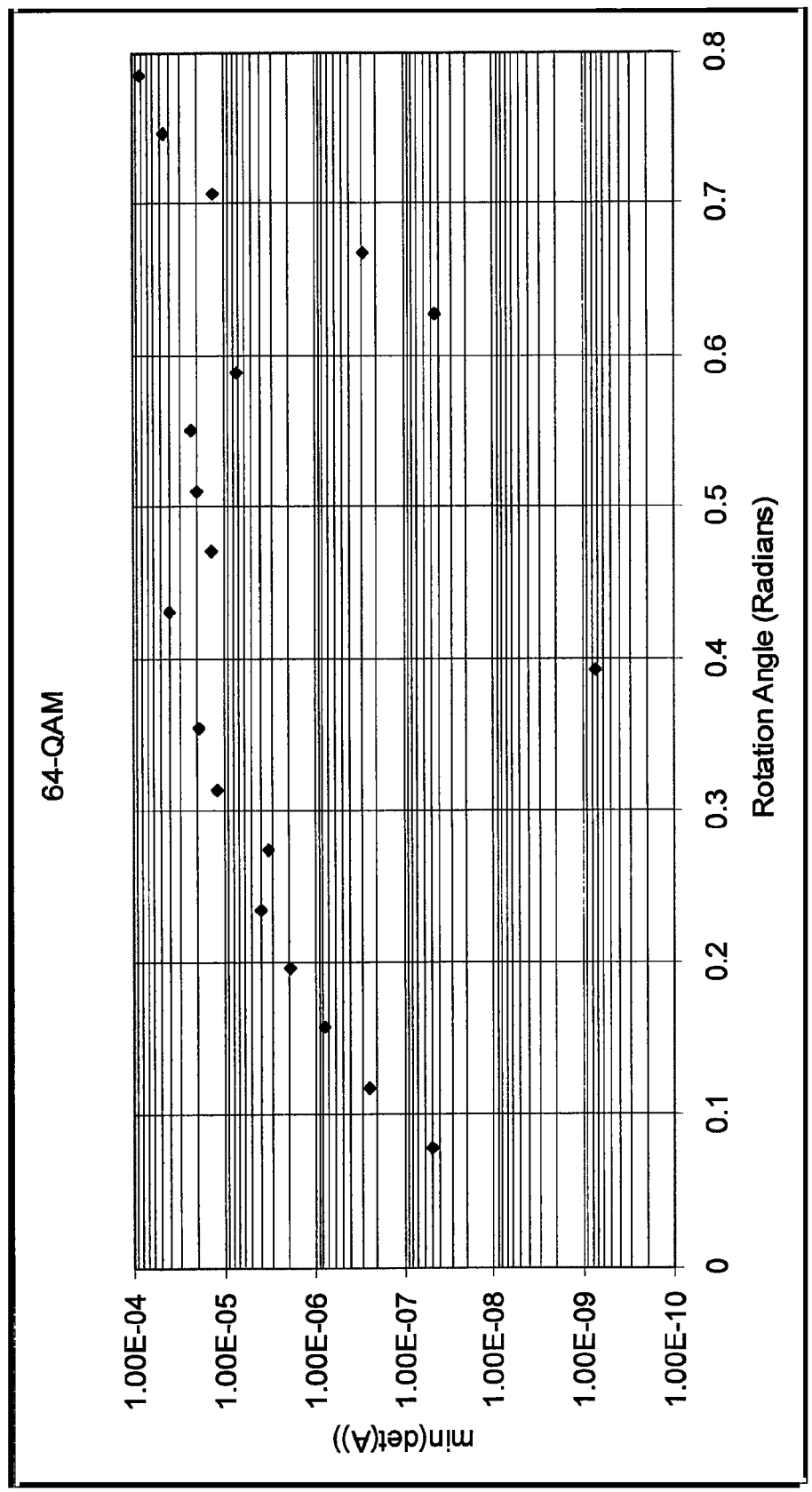
FIG. 11 graphically illustrates minimum determinant values for codeword distance matrices generated using 64-QAM mapping for various rotation angles.
Figure 12:
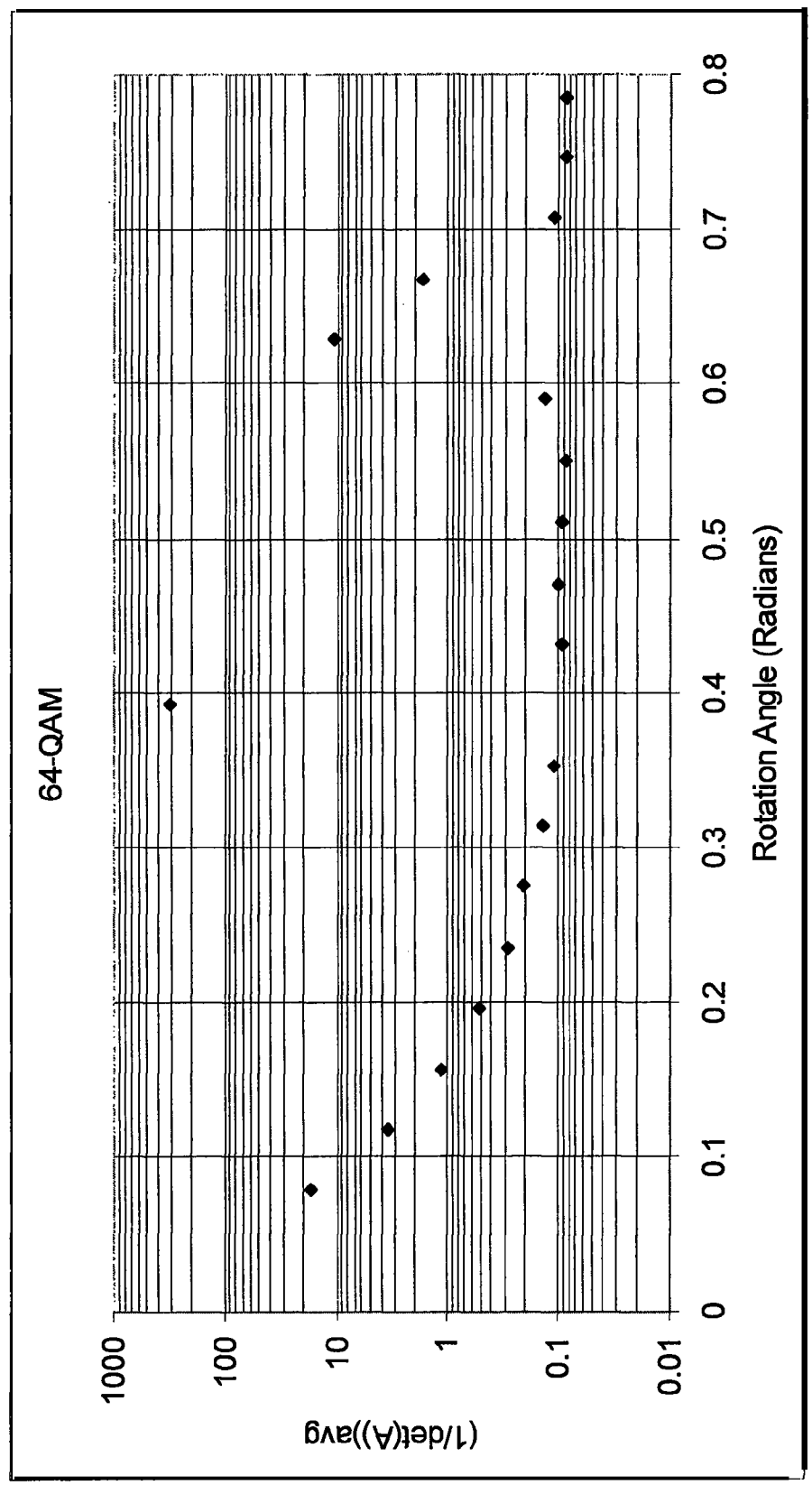
FIG. 12 graphically illustrates average reciprocal values for determinants of codeword distance matrices generated using 64-QAM mapping for various rotation angles.

FIGS. 7-12 graphically illustrate exemplary results of simulations performed using a rotation angle generator of the present invention. The simulations were performed for the STBC of Equation (2) using QPSK mapping, 16-QAM mapping, & 64-QAM mapping. Rotation angles $\theta_1$ and $\theta_2$ were set equal to zero ($\theta_1 = \theta_2 = 0$) and rotation angles $\theta_3$ and $\theta_4$ were set equal to rotation angle θ ($\theta_3 = \theta_4 = 0$). Further, the simulations were performed by only considering the possible combinations of distance values $\Delta_i$. As shown in FIG. 7, when using QPSK mapping, the maximum values of the minimum determinants occur when rotation angle θ is between about 0.5236 radians and about 0.80 radians. Further, for QPSK mapping, the minimum values of the average reciprocal determinants also occur when rotation angle θ is between about 0.5236 radians and about 0.80 radians as shown in FIG. 8. For 16-QAM, the maximum values of the minimum determinants and the minimum values of the average reciprocal determinants occur when rotation angle θ is between about 0.44 radians and about 0.56 radians or between about 0.71 radians and about 0.80 radians as shown in FIGS. 9 and 10, respectively. For 64-QAM, the maximum values of the minimum determinants and the minimum values of the average reciprocal determinants occur when rotation angle θ is between about 0.43 radians and about 0.55 radians or between about 0.71 radians and about 0.80 radians as shown in FIGS. 11 and 12, respectively.

While the present invention was described relative to its use with one particular quasi-orthogonal STBC (i.e., the STBC of Equation (2)), the present invention is not so limited. The present invention may be used with other quasi-orthogonal STBCs that code four data symbols for transmission via four transmitter antennas over four transmission times. In such other quasi-orthogonal codes, the relative angles that affect the outcome of the two criteria may be different than those of the STBC of Equation (2). For example, according to other quasi-orthogonal codes, the relative angle between the first data symbol and third data symbol in a group or the relative angle between the second data symbol and fourth data symbol in a group may affect the outcome. In this example, $\theta_1$ and $\theta_3$ may be set equal to 0 (i.e., $\theta_1=\theta_3=0$) and $\theta_2$ may be set equal to $\theta_4$ (i.e., $\theta_2=\theta_4=\theta$). Further, the present invention may be used with block codes that do not achieve full rate.

Further, the present invention may be used to design quasi-orthogonal space-frequency block codes (SFBCs). A quasi-orthogonal SFBC may be represented by a matrix similar to that of Equation (2). Note, however, that the rows of the SFBC represent different frequencies rather than different transmission times.

According to various embodiments of the present invention, a single rotation angle generator may be envisioned that employs both rotation angle generator 500 and rotation angle generator 600 to generate a single rotation angle $\theta$. For example, according to various embodiments, step 542 of rotation angle generator 500 and step 642 of rotation angle generator 600 may be replaced by a single step that selects one common rotation angle $\theta$ that is saved by both rotation angle generator 500 and rotation angle generator 600. Further, according to various embodiments, each step that is common to both rotation angle generator 500 and rotation angle generator 600 may be implemented in a single step so that redundant steps are not performed by the single rotation angle generator.

According to further embodiments of the present invention, the first two rotation angles $\theta_1$ and $\theta_2$ may be fixed to some value other than zero. Note that the value of the selected rotation angle $\theta$ is relative to the first two rotation angles $\theta_1$ and $\theta_2$. Thus, the value of the selected rotation angle $\theta$ should preferably be adjusted in relation to the first two rotation angles $\theta_1$ and $\theta_2$.

According to yet further embodiments of the present invention, the set of all possible codewords $s_p$ may be generated in a single step. Then, each time a possible codeword $s_p$ is determined (e.g., steps 512 and 612), the possible codeword $s_p$ may be selected from the set of generated codewords $s_p$. Similarly, the set of all possible erroneously decoded codewords $e_p^i$ may be generated in a single step.

According to yet even further embodiments of the present invention, the nested loops could be arranged in a different manner. For example, the rotation angle generator could be implemented such that a single codeword is considered for each possible rotation angle $\theta$. Then, the codeword may be changed and this process could be repeated for all possible codewords.

According to yet still further embodiments of the present invention, rather than storing all rotation angles $\theta$ that correspond to the max(min(det(A))) value or the min((1/det (A)))$_{average}$) value, as is performed in the embodiments of FIGS. 5 and 6, respectively, one rotation angle $\theta$ corresponding to the max(min(det(A))) value or the min((1/det (A))$_{average}$) value may be stored. For example, each time a current min(det(A))) value is greater than or equal to the stored max(min(det(A))) value, the rotation angle $\theta$ corresponding to the current min(det(A))) value may replace the stored rotation angle $\theta$. According to these embodiments, the step of selecting an angle $\theta$ (e.g., steps 542 and 642) need not be performed.

The present invention has been described in the context of techniques for determining rotation angles for STBCs and SFBCs. The present invention can also be implemented in the context of transmitters and receivers that apply certain rotation angles, whether those rotation angles have been determined using the described techniques or other possible techniques. For example, for QPSK codes, the present invention can be implemented as transmitters and receivers using rotation angles $\theta$ between about 0.5236 radians and about 0.80 radians. For 16-QAM codes, the present invention can be implemented as transmitters and receivers using rotation angles $\theta$ between about 0.44 radians and about 0.56 radians or between about 0.71 radians and about 0.80 radians. For 64-QAM codes, the present invention can be implemented as transmitters and receivers using rotation angles $\theta$ between about 0.43 radians and about 0.55 radians or between about 0.71 radians and about 0.80 radians.

Those skilled in the art will understand that the particular constellations achieved using a specific rotation angle $\theta$ can also be achieved using other rotation angles. For example, for QPSK codes, the constellations achieved using a rotation angle $\theta$ of $\pi/4$ radians are equivalent to the constellations achieved using rotation angles of $3\pi/4$, $5\pi/4$, and $7\pi/4$ radians. As recited in the claims, if a second constellation is equivalent to a rotated constellation produced by rotating a first constellation by a particular rotation angle, then the term "second constellation" covers the rotated constellation as well as any equivalent constellation produced by rotating the first constellation by other rotation angles. For example, if the rotated constellation is produced by rotating the first constellation by a specific angle $\theta$ that is less than $\pi/4$ radians, then the term "second constellation" would cover that rotated constellation as well as any constellation produced by rotating the first constellation by $(\pi/2-\theta)$ radians, $(\pi/2+\theta)$ radians, $(\pi-\theta)$ radians, $(\pi+\theta)$ radians, and so on, because all of those produced constellations are equivalent to one another due to the symmetry of the first constellation.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

We claim:

1. A method for determining K rotation angles for rotating a set of K input data symbols to be applied to a block code that encodes the resulting set of K rotated data symbols, the method comprising:
   (a) selecting a first rotation angle for a first subset of the K rotation angles;
   (b) for each combination of (i) each of a plurality of different possible second rotation angles for a second subset of the K rotation angles, (ii) each of a plurality of different possible codewords for the first rotation angle and each possible second rotation angle, and (iii) each of a plurality of different possible erroneously decoded codewords for each possible codeword, generating a metric for said each combination;
   (c) selecting a second rotation angle for the second subset of the K rotation angles based on the metrics of step (b); and
   (d) providing a transmitter configured based on the selected first and second rotation angles, wherein, for each set of K input data symbols, the transmitter is adapted to:
      (1) rotate the first subset of the K input data symbols based on the selected first rotation angle;
      (2) rotate the second subset of the K input data symbols based on the selected second rotation angle; and
      (3) apply the block code to the resulting set of K rotated data symbols to generate an outgoing codeword for transmission from the transmitter, wherein the block code is a space-frequency block code.

2. The invention of claim 1, further comprising the step of operating the transmitter to transmit the outgoing codeword.

3. The invention of claim 1, wherein K=4.

4. The invention of claim 3, wherein:
   the first subset of K=4 input data symbols comprises first and second of the K=4 input data symbols; and
   the second subset of K=4 input data symbols comprises third and fourth of the K=4 input data symbols.

5. The invention of claim 4, wherein the selected first rotation angle is 0 degrees.

6. The invention of claim 1, wherein step (b) comprises:
   (b1) determining a codeword difference matrix for said each combination;
   (b2) determining a codeword distance matrix based on the codeword difference matrix; and
   (b3) determining a determinant of the codeword distance matrix, wherein the metric is based on the determinant.

7. The invention of claim 6, wherein step (b) further comprises:
   (b4) generating a minimum determinant for the first rotation angle and the selected second rotation angle; and
   (b5) generating a maximum minimum determinant over all combinations of (i) the first rotation angle and (ii) the plurality of different possible second rotation angles.

8. The invention of claim 6, wherein step (b) further comprises:
   (b4) generating a reciprocal of the determinant;
   (b5) generating an average reciprocal for the first rotation angle and the selected second rotation angle; and
   (b6) generating a minimum average reciprocal over all combinations of (i) the first rotation angle and (ii) the plurality of different possible second rotation angles.

9. The invention of claim 1, wherein the block code is a quasi-orthogonal block code.

10. The invention of claim 1, wherein the K input data symbols are generated using a 16-quadrature amplitude modulation technique.

11. The invention of claim 1, wherein the K input data symbols are generated using a 64-quadrature amplitude modulation technique.

12. A transmitter comprising:
    a data symbol rotator adapted to rotate a set of K input data symbols by K rotation angles to generate a set of K rotated data symbols; and
    a block coder adapted to apply a block code to the set of K rotated data symbols to generate a codeword for transmission from the transmitter, wherein:
    wherein the block code is a space-frequency block code; and
    the K rotation angles are generated by:
       (a) selecting a first rotation angle for a first subset of the K rotation angles;
       (b) for each combination of (i) each of a plurality of different possible second rotation angles for a second subset of the K rotation angles, (ii) each of a plurality of different possible codewords for the first rotation angle and each possible second rotation angle, and (iii) each of a plurality of different possible erroneously decoded codewords for each possible codeword, generating a metric for said each combination; and
       (c) selecting a second rotation angle for the second subset of the K rotation angles based on the metrics of (b).

13. The invention of claim 12, further comprising a rotation angle generator adapted to:
    (a) select the first rotation angle for the first subset of the K rotation angles;
    (b) for said each combination of (i) said each of the plurality of different possible second rotation angles for the second subset of the K rotation angles, (ii) said each of the plurality of different possible codewords for the first rotation angle and each possible second rotation angle, and (iii) said each of the plurality of different possible erroneously decoded codewords for each possible codeword, generate the metric for said each combination; and (c) select the second rotation angle for the second subset of the K rotation angles based on the metrics of (b).

14. The invention of claim 12, wherein K=4.

15. The invention of claim 14, wherein:
the first subset of K=4 input data symbols comprises first and second of the K=4 input data symbols; and
the second subset of K=4 input data symbols comprises third and fourth of the K=4 input data symbols.

16. The invention of claim 15, wherein the selected first rotation angle is 0 degrees.

17. The invention of claim 12, wherein generating the metric comprises:
(b1) determining a codeword difference matrix for said each combination;
(b2) determining a codeword distance matrix based on the codeword difference matrix; and
(b3) determining a determinant of the codeword distance matrix, wherein the metric is based on the determinant.

18. The invention of claim 17, wherein generating the metric further comprises:
(b4) generating a minimum determinant for the first rotation angle and the selected second rotation angle; and
(b5) generating a maximum minimum determinant over all combinations of (i) the first rotation angle and (ii) the plurality of different possible second rotation angles.

19. The invention of claim 17, wherein generating the metric further comprises:
(b4) generating a reciprocal of the determinant;
(b5) generating an average reciprocal for the first rotation angle and the selected second rotation angle; and
(b6) generating a minimum average reciprocal over all combinations of (i) the first rotation angle and (ii) the plurality of different possible second rotation angles.

20. A method for transmitting data, comprising:
(a) applying 16-QAM coding to convert an input bitstream into a stream of 16-QAM symbols;
(b) dividing the stream of 16-QAM symbols into sets of four 16-QAM symbols, each set comprising first, second, third, and fourth 16-QAM symbols;
(c) for the first and second 16-QAM symbols of each set, generating first and second rotated 16-QAM symbols corresponding to a first 16-QAM constellation;
(d) for the third and fourth 16-QAM symbols of each set, generating third and fourth rotated 16-QAM symbols corresponding to a second 16-QAM constellation, wherein the second 16-QAM constellation is equivalent to a rotated constellation produced by rotating the first 16-QAM constellation by a rotation angle that is between about 0.44 radians and about 0.56 radians or between about 0.71 radians and about 0.80 radians;
(e) applying a quasi-orthogonal block code to each set of rotated 16-QAM symbols to generate a block codeword; and
(f) transmitting the block codeword, wherein the quasi-orthogonal block code is represented by:

$$\begin{bmatrix} x_1 & x_2 & x_3 & x_4 \\ -x_2^* & x_1^* & -x_4^* & x_3^* \\ -x_3^* & -x_4^* & x_1^* & x_2^* \\ x_4 & -x_3 & -x_2 & x_1 \end{bmatrix},$$

where each element $x_k$ corresponds to one of the four data symbols in a set, where k=1, ..., 4;

each element $x_k^*$ corresponds to that a complex conjugate value of one of the four data symbols in a set;
each element $-x_k$ corresponds to a negated value of one of the four data symbols in a set; and
each element $-x_k^*$ corresponds to a negated value of a complex conjugate value of one of the four data symbols in a set.

21. The invention of claim 20, wherein:
step (c) is equivalent to rotating the first and second 16-QAM symbols by 0 radians; and
step (d) is equivalent to rotating the third and fourth 16-QAM symbols by the rotation angle.

22. A method for transmitting data, comprising:
(a) applying 64-QAM coding to convert an input bitstream into a stream of 64-QAM symbols;
(b) dividing the stream of 64-QAM symbols into sets of four 64-QAM symbols, each set comprising first, second, third, and fourth 64-QAM symbols;
(c) for the first and second 64-QAM symbols of each set, generating first and second rotated 64-QAM symbols corresponding to a first 64-QAM constellation;
(d) for the third and fourth 64-QAM symbols of each set, generating third and fourth rotated 64-QAM symbols corresponding to a second 64-QAM constellation, wherein the second 64-QAM constellation is equivalent to a rotated constellation produced by rotating the first 64-QAM constellation by a rotation angle that is between about 0.43 degrees and about 0.55 degrees or between about 0.71 degrees and about 0.80 degrees;
(e) applying a quasi-orthogonal block code to each set of rotated 64-QAM symbols to generate a block codeword; and
(f) transmitting the block codeword, wherein the quasi-orthogonal block code is represented by:

$$\begin{bmatrix} x_1 & x_2 & x_3 & x_4 \\ -x_2^* & x_1^* & -x_4^* & x_3^* \\ -x_3^* & -x_4^* & x_1^* & x_2^* \\ x_4 & -x_3 & -x_2 & x_1 \end{bmatrix},$$

where each element $x_k$ corresponds to one of the four data symbols in a set, where k=1, ..., 4;
each element $x_k^*$ corresponds to that a complex conjugate value of one of the four data symbols in a set;
each element $-x_k$ corresponds to a negated value of one of the four data symbols in a set; and
each element $-x_k^*$ corresponds to a negated value of a complex conjugate value of one of the four data symbols in a set.

23. The invention of claim 22, wherein:
step (c) is equivalent to rotating the first and second 16-QAM symbols by 0 radians; and
step (d) is equivalent to rotating the third and fourth 16-QAM symbols by the rotation angle.

24. A method for determining K rotation angles for rotating a set of K input data symbols to be applied to a block code that encodes the resulting set of K rotated data symbols, the method comprising:
(a) selecting a first rotation angle for a first subset of the K rotation angles;
(b) for each combination of (i) each of a plurality of different possible second rotation angles for a second subset of the K rotation angles, (ii) each of a plurality of different possible codewords for the first rotation angle and each possible second rotation angle, and (iii) each of a plurality of different possible erroneously decoded codewords for each possible codeword, generating a metric for said each combination, wherein step (b) comprises:
  (b1) determining a codeword difference matrix for said each combination;
  (b2) determining a codeword distance matrix based on the codeword difference matrix;
  (b3) determining a determinant of the codeword distance matrix, wherein the metric is based on the determinant;
  (b4) generating a minimum determinant for the first rotation angle and the selected second rotation angle; and
  (b5) generating a maximum minimum determinant over all combinations of (i) the first rotation angle and (ii) the plurality of different possible second rotation angles;
(c) selecting a second rotation angle for the second subset of the K rotation angles based on the metrics of step (b); and
(d) providing a transmitter configured based on the selected first and second rotation angles, wherein, for each set of K input data symbols, the transmitter is adapted to:
  (1) rotate the first subset of the K input data symbols based on the selected first rotation angle;
  (2) rotate the second subset of the K input data symbols based on the selected second rotation angle; and
  (3) apply the block code to the resulting set of K rotated data symbols to generate an outgoing codeword for transmission from the transmitter.

25. A method for determining K rotation angles for rotating a set of K input data symbols to be applied to a block code that encodes the resulting set of K rotated data symbols, the method comprising:
(a) selecting a first rotation angle for a first subset of the K rotation angles;
(b) for each combination of (i) each of a plurality of different possible second rotation angles for a second subset of the K rotation angles, (ii) each of a plurality of different possible codewords for the first rotation angle and each possible second rotation angle, and (iii) each of a plurality of different possible erroneously decoded codewords for each possible codeword, generating a metric for said each combination, wherein step (b) comprises:
  (b1) determining a codeword difference matrix for said each combination;
  (b2) determining a codeword distance matrix based on the codeword difference matrix;
  (b3) determining a determinant of the codeword distance matrix, wherein the metric is based on the determinant;
  (b4) generating a reciprocal of the determinant;
  (b5) generating an average reciprocal for the first rotation angle and the selected second rotation angle; and
  (b6) generating a minimum average reciprocal over all combinations of (i) the first rotation angle and (ii) the plurality of different possible second rotation angles;
(c) selecting a second rotation angle for the second subset of the K rotation angles based on the metrics of step (b); and
(d) providing a transmitter configured based on the selected first and second rotation angles, wherein, for each set of K input data symbols, the transmitter is adapted to:
  (1) rotate the first subset of the K input data symbols based on the selected first rotation angle;
  (2) rotate the second subset of the K input data symbols based on the selected second rotation angle; and
  (3) apply the block code to the resulting set of K rotated data symbols to generate an outgoing codeword for transmission from the transmitter.

26. A transmitter comprising:
a data symbol rotator adapted to rotate a set of K input data symbols by K rotation angles to generate a set of K rotated data symbols; and
a block coder adapted to apply a block code to the set of K rotated data symbols to generate a codeword for transmission from the transmitter, wherein the K rotation angles are generated by:
(a) selecting a first rotation angle for a first subset of the K rotation angles;
(b) for each combination of (i) each of a plurality of different possible second rotation angles for a second subset of the K rotation angles, (ii) each of a plurality of different possible codewords for the first rotation angle and each possible second rotation angle, and (iii) each of a plurality of different possible erroneously decoded codewords for each possible codeword, generating a metric for said each combination, wherein generating the metric comprises:
  (b1) determining a codeword difference matrix for said each combination;
  (b2) determining a codeword distance matrix based on the codeword difference matrix;
  (b3) determining a determinant of the codeword distance matrix, wherein the metric is based on the determinant;
  (b4) generating a minimum determinant for the first rotation angle and the selected second rotation angle; and
  (b5) generating a maximum minimum determinant over all combinations of (i) the first rotation angle and (ii) the plurality of different possible second rotation angles; and
(c) selecting a second rotation angle for the second subset of the K rotation angles based on the metrics of (b).

27. A transmitter comprising:
a data symbol rotator adapted to rotate a set of K input data symbols by K rotation angles to generate a set of K rotated data symbols; and
a block coder adapted to apply a block code to the set of K rotated data symbols to generate a codeword for transmission from the transmitter, wherein the K rotation angles are generated by:
(a) selecting a first rotation angle for a first subset of the K rotation angles;
(b) for each combination of (i) each of a plurality of different possible second rotation angles for a second subset of the K rotation angles, (ii) each of a plurality of different possible codewords for the first rotation angle and each possible second rotation angle, and (iii) each of a plurality of different possible erroneously decoded codewords for each possible codeword, generating a metric for said each combination, wherein generating the metric comprises:
  (b1) determining a codeword difference matrix for said each combination;
  (b2) determining a codeword distance matrix based on the codeword difference matrix;
  (b3) determining a determinant of the codeword distance matrix, wherein the metric is based on the determinant;
  (b4) generating a reciprocal of the determinant;
  (b5) generating an average reciprocal for the first rotation angle and the selected second rotation angle; and (b6) generating a minimum average reciprocal over all combinations of (i) the first rotation angle and (ii) the plurality of different possible second rotation angles; and (c) selecting a second rotation angle for the second subset of the K rotation angles based on the metrics of (b).

* * * * *